(12) United States Patent
Mohanty et al.

(10) Patent No.: US 12,254,431 B1
(45) Date of Patent: Mar. 18, 2025

(54) MUTUAL INFORMATION RESOLUTION RECOMMENDATIONS AND GRAPHICAL VISUALIZATIONS USING PROBABILISTIC GRAPHICAL MODELS

(71) Applicant: Blue Yonder Group, Inc., Scottsdale, AZ (US)

(72) Inventors: Deb Mohanty, Bangalore (IN); Phani Mitra Bulusu, Bangalore (IN); Rashid Puthiyapurayil, Bangalore (IN); Vidhi Chugh, Delhi (IN); Tushar Shekhar, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 130 days.

(21) Appl. No.: 17/747,758

(22) Filed: May 18, 2022

Related U.S. Application Data

(60) Provisional application No. 63/190,986, filed on May 20, 2021.

(51) Int. Cl.
| | |
|---|---|
| *G06Q 10/0631* | (2023.01) |
| *G06Q 10/04* | (2023.01) |
| *G06Q 10/087* | (2023.01) |

(52) U.S. Cl.
CPC ....... *G06Q 10/06315* (2013.01); *G06Q 10/04* (2013.01); *G06Q 10/087* (2013.01)

(58) Field of Classification Search
CPC .......................................... G06Q 10/00–50/00
USPC ................................................. 705/7.11–7.42
See application file for complete search history.

(56) References Cited

U.S. PATENT DOCUMENTS

| | | | |
|---|---|---|---|
| 8,352,397 B2* | 1/2013 | Rubin | G06N 5/04 706/45 |
| 11,720,070 B2* | 8/2023 | Brooks | G05B 13/041 700/47 |
| 2010/0325166 A1* | 12/2010 | Rubin | G06Q 10/04 707/791 |

(Continued)

OTHER PUBLICATIONS

Hosseini, Seyedmohsen, and Dmitry Ivanov. "Bayesian networks for supply chain risk, resilience and ripple effect analysis: A literature review." Expert systems with applications 161 (2020): 113649. (Year: 2020).*

(Continued)

*Primary Examiner* — Alan S Miller
(74) *Attorney, Agent, or Firm* — Spencer Fane LLP; Steven J. Laureanti

(57) ABSTRACT

A system and method are disclosed for training a probabilistic graphical model based on historical attributes of a supply chain to represent supply chain performance, selecting supply chain entity target variables, collating with the use of machine learning models, a list of features and classes pertaining to selected supply chain entity target variables, calculating first and second level features associated with the list of features and classes, generating supply chain predictions based on the trained probabilistic graphical model, where the supply chain predictions are based on test data, comparing the supply chain predictions to desired supply chain outputs to determine a delta distance, and generating resolution actions, to decrease the delta distance between the supply chain output predictions and the desired supply chain outputs.

20 Claims, 11 Drawing Sheets

(56) References Cited

U.S. PATENT DOCUMENTS

| 2014/0025358 | A1* | 1/2014 | Hill | G16B 5/00 |
| | | | | 703/2 |
| 2020/0372304 | A1* | 11/2020 | Kenthapadi | G06N 7/01 |
| 2021/0081840 | A1* | 3/2021 | Darmour | G06F 18/22 |
| 2023/0147449 | A1* | 5/2023 | Kulkarni | G06F 16/24578 |
| | | | | 705/7.25 |

OTHER PUBLICATIONS

Jordan, Michael I. "An introduction to probabilistic graphical models." (2003). (Year: 2003).*

Pernkopf, Franz, Robert Peharz, and Sebastian Tschiatschek. "Introduction to probabilistic graphical models." Academic Press Library in Signal Processing. vol. 1. Elsevier, 2014. 989-1064. (Year: 2014).*

Kao, Han-Ying, Chia-hui Huang, and Han-Lin Li. "Supply chain diagnostics with dynamic Bayesian networks." Computers & Industrial Engineering 49.2 (2005): 339-347. (Year: 2005).*

Lockamy III, Archie, and Kevin McCormack. "Modeling supplier risks using Bayesian networks." Industrial Management & Data Systems 112.2 (2012): 313-333. (Year: 2012).*

Qazi, Abroon, et al. "Supply chain risk network management: A Bayesian belief network and expected utility based approach for managing supply chain risks." International Journal of Production Economics 196 (2018): 24-42. (Year: 2018).*

Boutselis, Petros. Investigating the applicability of Bayesian networks to demand forecasting during the final phase of support operations. Diss. 2019. (Year: 2019).*

Hosseini, Seyedmohsen, Dmitry Ivanov, and Alexandre Dolgui. "Ripple effect modelling of supplier disruption: integrated Markov chain and dynamic Bayesian network approach." International Journal of Production Research 58.11 (2020): 3284-3303. (Year: 2020).*

* cited by examiner

| FIG. 6A |
| FIG. 6B |

MUTUAL INFORMATION RESOLUTION RECOMMENDATIONS AND GRAPHICAL VISUALIZATIONS USING PROBABILISTIC GRAPHICAL MODELS

CROSS REFERENCE TO RELATED APPLICATIONS

The present disclosure is related to that disclosed in the U.S. Provisional Application No. 63/190,986, filed May 20, 2021, entitled "Mutual Information Resolution Recommendations and Graphical Visualizations Using Probabilistic Graphical Models." U.S. Provisional Application No. 63/190,986 is assigned to the assignee of the present application. The present invention hereby claims priority under 35 U.S.C. § 119(e) to U.S. Provisional Application No. 63/190,986.

TECHNICAL FIELD

The present disclosure relates generally to supply chain planning and specifically to utilizing probabilistic graphical models to model and visualize supply chain states and to recommend resolution actions using mutual information.

BACKGROUND

Supply chain machine modeling systems may generate certain modeling data, to model the flow of materials through one or more supply chains and the individual entities, such as manufacturers, suppliers, distribution centers, retailers, and transportation hubs, which comprise supply chains. Such modeling data may represent a set of variables and their conditional dependencies via a directed acyclic graph. However, existing supply chain modeling systems do not feature the ability to separate supply chain features and attributes within the modeling data, and further are unable to recommend options based on separated supply chain features and attributes. Further, existing supply chain modeling systems do not feature the ability to graphically display their modeling data, which may hinder the ability of a user to understand or translate the modeling data. These drawbacks of existing supply chain modeling systems are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
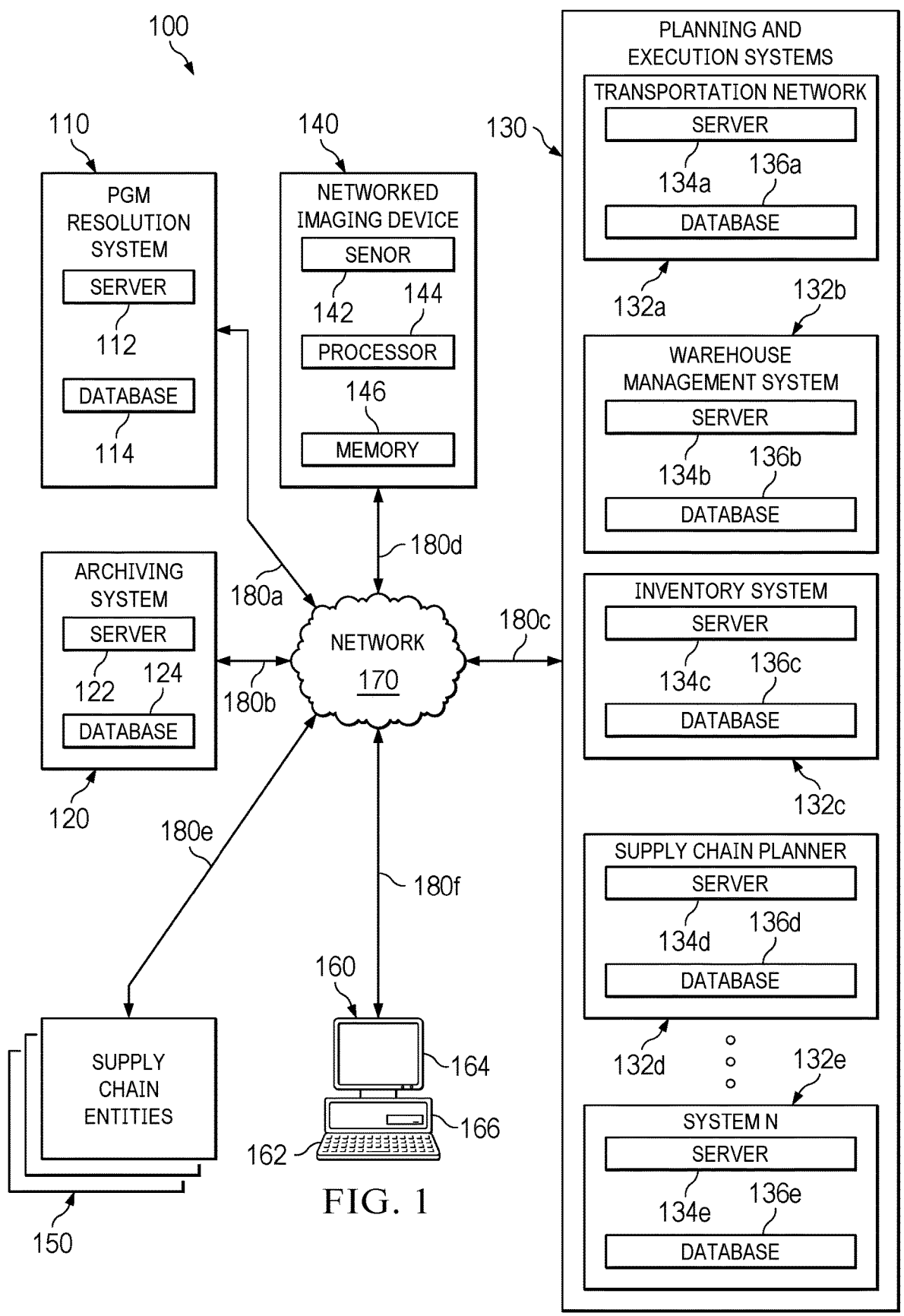
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments of the following disclosure provide a probabilistic graphical model (PGM) resolution system and method to generate supply chain probabilistic graphical models and associated resolution actions and visualizations. Embodiments comprise a PGM resolution system that generates PGMs and identifies (1) probability relationships within quantities modeled by the PGMs and (2) mutual information common to separate supply chain features and attributes. Embodiments generate predictions using the PGMs, probability relationships, and mutual information, and based on one or more predicted instances in which the supply chain may not meet all service level agreement (SLA) targets and mutual information shared between the PGM variables, embodiments generate and recommend one or more resolution actions to address the SLA shortfalls and/or to impact one or more desired key process indicators (KPIs) while also making the fewest possible changes to the supply chain. Embodiments generate visualizations to display the PGMs and resolution actions, and provide hierarchical visualizations of the effects that one or more model features have on the PGM predicted outputs.

Embodiments of the following disclosure generate one or more PGM networks, including one or more Bayesian PGM networks, which comprise and graph only important features and feature classes drawn from supply chain data. The PGM networks and/or Bayesian PGM networks limit the complexity of data displayed and modeled by the probabilistic graphical models, and enable the drawing of inferences and other data from the probabilistic graphical models quickly and efficiently without slowing the analysis process with the addition of unnecessary data, features, and feature classes. Embodiments generate graphical displays to visualize one or more probabilistic graphical models and to recommend resolution actions to alter variables or values associated with one or more supply chain features, attributes, and/or supply chain entities, thereby improving one or more KPI and/or SLA targets using the fewest number of changes required to the supply chain network.

FIG. 1 illustrates a supply chain network 100, in accordance with a first embodiment. The supply chain network 100 comprises probabilistic graphical model (PGM) resolution system 110, archiving system 120, transportation network 130, warehouse management system 133, inventory system 136, supply chain planner 140, one or more networked imaging devices 150, one or more supply chain entities 160, computer 170, network 180, and one or more communication links 181-189. Although a single PGM resolution system 110, a single archiving system 120, transportation network 130, warehouse management system 133, inventory system 136, supply chain planner 140, a single networked imaging device 150, one or more supply chain entities 160, a single computer 170, a single network 180, and one or more communication links 181-189 are illustrated and described, embodiments contemplate any number of PGM resolution systems 110, archiving systems 120, transportation networks 130, warehouse management systems 133, inventory systems 136, supply chain planners 140, networked imaging devices 150, supply chain entities 160, computers 170, networks 180 or communication links 181-189, according to particular needs.

In one embodiment, PGM resolution system 110 comprises server 112 and database 114. Server 112 comprises one or more modules that model supply chain network 100 and build probabilistic graphical models 228 of supply chain attributes, as described in greater detail below.

Archiving system 120 of supply chain network 100 comprises server 122 and database 124. Although archiving system 120 is illustrated as comprising a single server 122 and a single database 124, embodiments contemplate any suitable number of servers 122 or databases 124 internal to or externally coupled with archiving system 120. Server 122 of archiving system 120 may support one or more processes for receiving and storing data from transportation network 130, warehouse management system 133, inventory system 136, supply chain planner 140, networked imaging devices 150, one or more supply chain entities 160, and/or computer 170 of supply chain network 100. According to some embodiments, archiving system 120 comprises an archive of data received from transportation network 130, warehouse management system 133, inventory system 136, supply chain planner 140, networked imaging devices 150, one or more supply chain entities 160, and/or computer 170 of supply chain network 100. Archiving system 120 provides archived data to PGM resolution system 110 and transportation network 130, warehouse management system 133, inventory system 136, supply chain planner 140 to, for example, train one or more machine learning models. Server 122 may store the received data in database 124. Database 124 of archiving system 120 may comprise one or more databases or other data storage arrangements at one or more locations, local to, or remote from, server 122.

Transportation network 130 of supply chain network 100 comprises server 131 and database 132. Although transportation network 130 is illustrated as comprising a single server 131 and a single database 132, embodiments contemplate any suitable number of servers 131 or databases 132 internal to or externally coupled with transportation network 130. According to embodiments, transportation network 130 directs one or more transportation vehicles to ship one or more items between one or more supply chain entities 160, based, at least in part, on a supply chain plan, including a supply chain master plan, the number of items currently in stock at one or more supply chain entities 160 or other stocking location, the number of items currently in transit in transportation network 130, a forecasted demand, a supply chain disruption, and/or one or more other factors described herein. One or more transportation vehicles comprise, for example, any number of trucks, cars, vans, boats, airplanes, unmanned aerial vehicles (UAVs), cranes, robotic machinery, or the like. The one or more transportation vehicles may comprise radio, satellite, or other communication that communicates location information (such as, for example, geographic coordinates, distance from a location, global positioning satellite (GPS) information, or the like) with PGM resolution system 110, archiving system 120, transportation network 130, warehouse management system 133, inventory system 136, supply chain planner 140, networked imaging device 150, and/or one or more supply chain entities 160 to identify the location of the one or more transportation vehicles and the location of any inventory or shipment located on the one or more transportation vehicles.

Warehouse management system 133 of supply chain network 100 comprises server 134 and database 135. Although warehouse management system 133 is illustrated as comprising a single server 134 and a single database 135, embodiments contemplate any suitable number of servers 134 or databases 135 internal to or externally coupled with warehouse management system 133. According to embodiments, server 134 comprises one or more modules that manage and operate warehouse operations, plan timing and identity of shipments, generate picklists, packing plans, and instructions. Warehouse management system 133 instructs users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate warehouse management system 133 determining routing, packing, or placement of any item, package, or container into any packing area, including, packing any item, package, or container in another item, package, or container. Warehouse management system 133 may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like.

Inventory system 136 of supply chain network 100 comprises server 137 and database 138. Although inventory system 136 is illustrated as comprising a single server 137 and a single database 138, embodiments contemplate any suitable number of servers 137 or databases 138 internal to or externally coupled with inventory system 136. Server 137 of inventory system 136 is configured to receive and transmit item data, including item identifiers, pricing data, attribute data, inventory levels, and other like data about one or more items at one or more stocking locations in supply chain network 100. Server 137 stores and retrieves item data from database 138 or from one or more locations in supply chain network 100.

Supply chain planner 140 of supply chain network 100 comprises server 142 and database 144. Although supply chain planner 140 is illustrated as comprising a single server 142 and a single database 144, embodiments contemplate any suitable number of servers 142 or databases 144 internal to or externally coupled with supply chain planner 140. Server 142 of supply chain planner 140 comprises one or more modules, such as, for example, a planning module 250, a solver 254, a modeler 252, and/or an engine, for performing activities of one or more planning and execution processes. Supply chain planner 140 may model and solve supply chain planning problems (such as, for example, operation planning problems). Supply chain planner 140 generates the supply chain planning problem solutions, which are used by PGM resolution system 110 to construct training data 230. In one embodiment, Supply chain planner 140 may use probabilistic graphical model 228 to predict target supply chain attributes needed to reach a target state of the supply chain, or other predicted supply chain information or status, as described in further detail below. One or more networked imaging devices 150 comprise one or more processors 154, memory 156, one or more sensors 152, and may include any suitable input device, output device, fixed or removable computer-readable storage media, or the like. According to embodiments, one or more networked imaging devices 150 comprise an electronic device that receives imaging data from one or more sensors 152 or from one or more databases in supply chain network 100. One or more sensors 152 of one or more networked imaging devices 150 may comprise an imaging sensor, such as, a camera, scanner, electronic eye, photodiode, charged coupled device (CCD), or any other electronic component that detects visual characteristics (such as color, shape, size, fill level, or the like) of objects. One or more networked imaging devices 150 may comprise, for example, a mobile handheld electronic device such as, for example, a smartphone, a tablet computer, a wireless communication device, and/or one or more networked electronic devices configured to image items using one or more sensors 152 and transmit product images to one or more databases.

In addition, or as an alternative, one or more sensors 152 may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. One or more networked imaging devices 150 may generate a mapping of one or more items in supply chain network 100 by scanning an identifier or object associated with an item and identifying the item based, at least in part, on the scan. This may include, for example, a stationary scanner located at one or more supply chain entities 160 that scans items as the items pass near the scanner. In an embodiment, PGM resolution system 110, archiving system 120, transportation network 130, warehouse management system 133, inventory system 136, supply chain planner 140, networked imaging devices 150, and/or one or more supply chain entities 160 may use the mapping of an item to locate the item in supply chain network 100. The location of the item may be used to coordinate the storage and transportation of items in supply chain network 100 according to one or more plans and/or a reallocation of materials or capacity generated by supply chain planner 140. Plans may comprise one or more of a master supply chain plan, production plan, operations plan, distribution plan, and the like.

In addition, one or more sensors 152 of one or more networked imaging devices 150 may be located at one or more locations local to, or remote from, one or more networked imaging devices 150, including, for example, one or more sensors 152 integrated into one or more networked imaging devices 150 or one or more sensors 152 remotely located from, but communicatively coupled with, one or more networked imaging devices 150. According to some embodiments, one or more sensors 152 may be configured to communicate directly or indirectly with one or more of PGM resolution system 110, archiving system 120, transportation network 130, warehouse management system 133, inventory system 136, supply chain planner 140, networked imaging device 150, one or more supply chain entities 160, computer 170, and/or network using one or more communication links 181-189.

One or more supply chain entities 160 may represent one or more suppliers, manufacturers, distribution centers, and retailers in one or more supply chain networks 100, including one or more enterprises. One or more suppliers may be any suitable entity that offers to sell or otherwise provides one or more components to one or more manufacturers. One or more suppliers may, for example, receive a product from a first supply chain entity in supply chain network 100 and provide the product to another supply chain entity. One or more suppliers may comprise automated distribution systems that automatically transport products to one or more manufacturers based, at least in part, on a supply chain plan, the number of items currently in stock at one or more supply chain entities 160, the number of items currently in transit in transportation network 130, a forecasted demand, a supply chain disruption, a material or capacity reallocation, current and projected inventory levels at one or more stocking locations, and/or one or more additional factors described herein.

A manufacturer may be any suitable entity that manufactures at least one product. A manufacturer may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, such as a supplier, an item that needs further processing, or any other item. A manufacturer may, for example, produce and sell a product to a supplier, another manufacturer, a distribution center, a retailer, a customer, or any other suitable person or an entity. Such manufacturers may comprise automated robotic production machinery that produce products based, at least in part, on a supply chain plan, the number of items currently in stock at one or more supply chain entities 160, the number of items currently in transit in transportation network 130, a forecasted demand, a supply chain disruption, a material or capacity reallocation, current and projected inventory levels at one or more stocking locations, and/or one or more additional factors described herein.

One or more distribution centers may be any suitable entity that offers to sell or otherwise distributes at least one product to one or more retailers and/or customers. Distribution centers may, for example, receive a product from a first supply chain entity in supply chain network 100 and store and transport the product for a second supply chain entity. Such distribution centers may comprise automated warehousing systems that automatically transport to one or more retailers or customers and/or automatically remove an item from, or place an item into, inventory based, at least in part, on a supply chain plan, the number of items currently in stock at one or more supply chain entities 160, the number of items currently in transit in transportation network 130, a forecasted demand, a supply chain disruption, a material or capacity reallocation, current and projected inventory levels at one or more stocking locations, and/or one or more additional factors described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on a supply chain plan, the number of items currently in stock at one or more supply chain entities 160, the number of items currently in transit in transportation network 130, a forecasted demand, a supply chain disruption, a material or capacity reallocation, current and projected inventory levels at one or more stocking locations, and/or one or more additional factors described herein.

Although one or more suppliers, manufacturers, distribution centers, and retailers are illustrated and described as separate and distinct entities, the same entity may simultaneously act as any one or more suppliers, manufacturers, distribution centers, and retailers. For example, one or more manufacturers acting as a manufacturer could produce a product, and the same entity could act as a supplier to supply a product to another supply chain entity. Although one example of supply chain network 100 is illustrated and described, embodiments contemplate any configuration of supply chain network 100, without departing from the scope of the present disclosure.

As illustrated by FIG. 1, supply chain network 100 comprising PGM resolution system 110, archiving system 120, transportation network 130, warehouse management system 133, inventory system 136, supply chain planner 140, one or more networked imaging devices 150, and one or more supply chain entities 160 may operate on one or more computers 170 that are integral to or separate from the hardware and/or software that support PGM resolution system 110, archiving system 120, transportation network 130, warehouse management system 133, inventory system 136, supply chain planner 140, one or more networked imaging devices 150, and one or more supply chain entities 160. One or more computers 170 may include any suitable input device 172, such as a keypad, mouse, touch screen, microphone, or other device to input information. One or more computers 170 may also comprise one or more output devices 174, including but not limited to one or more computer monitors, which may convey information associated with the operation of supply chain network 100, including digital or analog data, visual information, or audio information.

One or more computers 170 may include fixed or removable computer-readable storage media 176, including a non-transitory computer readable medium, magnetic computer disks, flash drives, CD-ROM, in-memory devices or other suitable media to receive output from and provide input to supply chain network 100. One or more computers 170 may include one or more processors and associated memory to execute instructions and manipulate information according to the operation of supply chain network 100 and any of the methods described herein. In addition, or as an alternative, embodiments contemplate executing the instructions on one or more computers 170 that cause one or more computers 170 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

PGM resolution system 110, archiving system 120, transportation network 130, warehouse management system 133, inventory system 136, supply chain planner 140, one or more networked imaging devices 150, and one or more supply chain entities 160 may each operate on one or more separate computers 170, network 180 of one or more separate or collective computers 170, or may operate on one or more shared computers 170. In addition, supply chain network 100 may comprise a cloud-based computing system having processing and storage devices at one or more locations, local to, or remote from PGM resolution system 110, archiving system 120, transportation network 130, warehouse management system 133, inventory system 136, supply chain planner 140, one or more networked imaging devices 150, and one or more supply chain entities 160. In addition, each of one or more computers 170 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with PGM resolution system 110, archiving system 120, transportation network 130, warehouse management system 133, inventory system 136, supply chain planner 140, one or more networked imaging devices 150, and one or more supply chain entities 160.

These one or more users may include, for example, a "manager" or a "planner" handling supply chain planning, training PGM resolution system 110, and/or one or more related tasks within supply chain network 100. In addition, or as an alternative, these one or more users within supply chain network 100 may include, for example, one or more computers 170 programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery (including producing items), and/or one or more related tasks within supply chain network 100.

In one embodiment, PGM resolution system 110 may be coupled with network 180 using communications link 181, which may be any wireline, wireless, or other link suitable to support data communications between PGM resolution system 110 and network 180 during operation of supply chain network 100. Archiving system 120 may be coupled with network 180 using communications link 182, which may be any wireline, wireless, or other link suitable to support data communications between archiving system 120 and network 180 during operation of supply chain network 100. Transportation network 130 may be coupled with network 180 using communications link 183, which may be any wireline, wireless, or other link suitable to support data communications between transportation network 130 and network 180 during operation of supply chain network 100. Warehouse management system 133 may be coupled with network 180 using communications link 184, which may be any wireline, wireless, or other link suitable to support data communications between warehouse management system 133 and network 180 during operation of supply chain network 100. Inventory system 136 may be coupled with network 180 using communications link 185, which may be any wireline, wireless, or other link suitable to support data communications between inventory system 136 and network 180 during operation of supply chain network 100. Supply chain planner 140 may be coupled with network 180 using communications link 186, which may be any wireline, wireless, or other link suitable to support data communications between supply chain planner 140 and network 180 during operation of supply chain network 100. One or more networked imaging devices 150 are coupled with network 180 using communications link 187, which may be any wireline, wireless, or other link suitable to support data communications between one or more networked imaging devices 150 and network 180 during operation of distributed supply chain network 100. One or more supply chain entities 160 may be coupled with network 180 using communications link 188, which may be any wireline, wireless, or other link suitable to support data communications between one or more supply chain entities 160 and network 180 during operation of supply chain network 100. One or more computers 170 may be coupled with network 180 using communications link 189, which may be any wireline, wireless, or other link suitable to support data communications between a computer 170 and network 180 during operation of supply chain network 100.

Although communication links 181-189 are illustrated as generally coupling PGM resolution system 110, archiving system 120, transportation network 130, warehouse management system 133, inventory system 136, supply chain planner 140, networked imaging device 150, one or more supply chain entities 160, and computer 170 to network 180, each of PGM resolution system 110, archiving system 120, transportation network 130, warehouse management system 133, inventory system 136, supply chain planner 140, networked imaging device 150, one or more supply chain entities 160, and computer 170 may communicate directly with each other, according to particular needs.

In another embodiment, network 180 includes the Internet and any appropriate local area networks (LANs), metropolitan area networks (MANs), or wide area networks (WANs) coupling PGM resolution system 110, archiving system 120, transportation network 130, warehouse management system 133, inventory system 136, supply chain planner 140, networked imaging device 150, one or more supply chain entities 160, and computer 170. For example, data may be maintained locally or externally of PGM resolution system 110, archiving system 120, transportation network 130, warehouse management system 133, inventory system 136, supply chain planner 140, networked imaging device 150, one or more supply chain entities 160, and computer 170 and made available to one or more associated users of PGM resolution system 110, archiving system 120, transportation network 130, warehouse management system 133, inventory system 136, supply chain planner 140, networked imaging device 150, one or more supply chain entities 160, and computer 170 using network 180 or in any other appropriate manner. Those skilled in the art will recognize that the complete structure and operation of network 180 and other components within supply chain network 100 are not depicted or described. Embodiments may be employed in conjunction with known communications networks and other components.

In accordance with the principles of embodiments described herein, supply chain planner 140 may generate a supply chain plan. Furthermore, one or more computers 170 associated with transportation network 130, warehouse management system 133, and inventory system 136 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 160, and the configuration and quantity of packaging and shipping of items based on a supply chain plan, the number of items currently in stock at one or more supply chain entities 160, the number of items currently in transit in transportation network 130, a forecasted demand, a supply chain disruption, a material or capacity reallocation, current and projected inventory levels at one or more stocking locations, and/or one or more additional factors described herein. For example, the methods described herein may include computers 170 receiving product data 284 from automated machinery having at least one sensor and product data 284 corresponding to an item detected by the automated machinery. The received product data 284 may include an image of the item, an identifier, as described above, and/or product information associated with the item, including, for example, dimensions, texture, estimated weight, and the like. Computers 170 may also receive, from one or more sensors 152 of one or more networked imaging devices 150, a current location of the identified item.

The methods may further include computers 170 looking up the received product data 284 in database system associated with supply chain planner 140 to identify the item corresponding to product data 284 received from automated machinery. Based on the identification of the item, computers 170 may also identify (or alternatively generate) a first mapping in database system, where the first mapping is associated with the current location of the identified item. Computers 170 may also identify a second mapping in database system, where the second mapping is associated with a past location of the identified item. Computers 170 may also compare the first mapping and the second mapping to determine if the current location of the identified item in the first mapping is different than the past location of the identified item in the second mapping. Computers 170 may send instructions to the automated machinery based, as least in part, on one or more differences between the first mapping and the second mapping such as, for example, to locate items to add to or remove from an inventory of or shipment for one or more supply chain entities 160. In addition, or as an alternative, transportation network 130, warehouse management system 133, inventory system 136, supply chain planner 140 monitors one or more supply chain constraints of one or more items at one or more supply chain entities 160 and adjusts the orders and/or inventory of one or more supply chain entities 160 at least partially based on one or more supply chain constraints.

Figure 2:
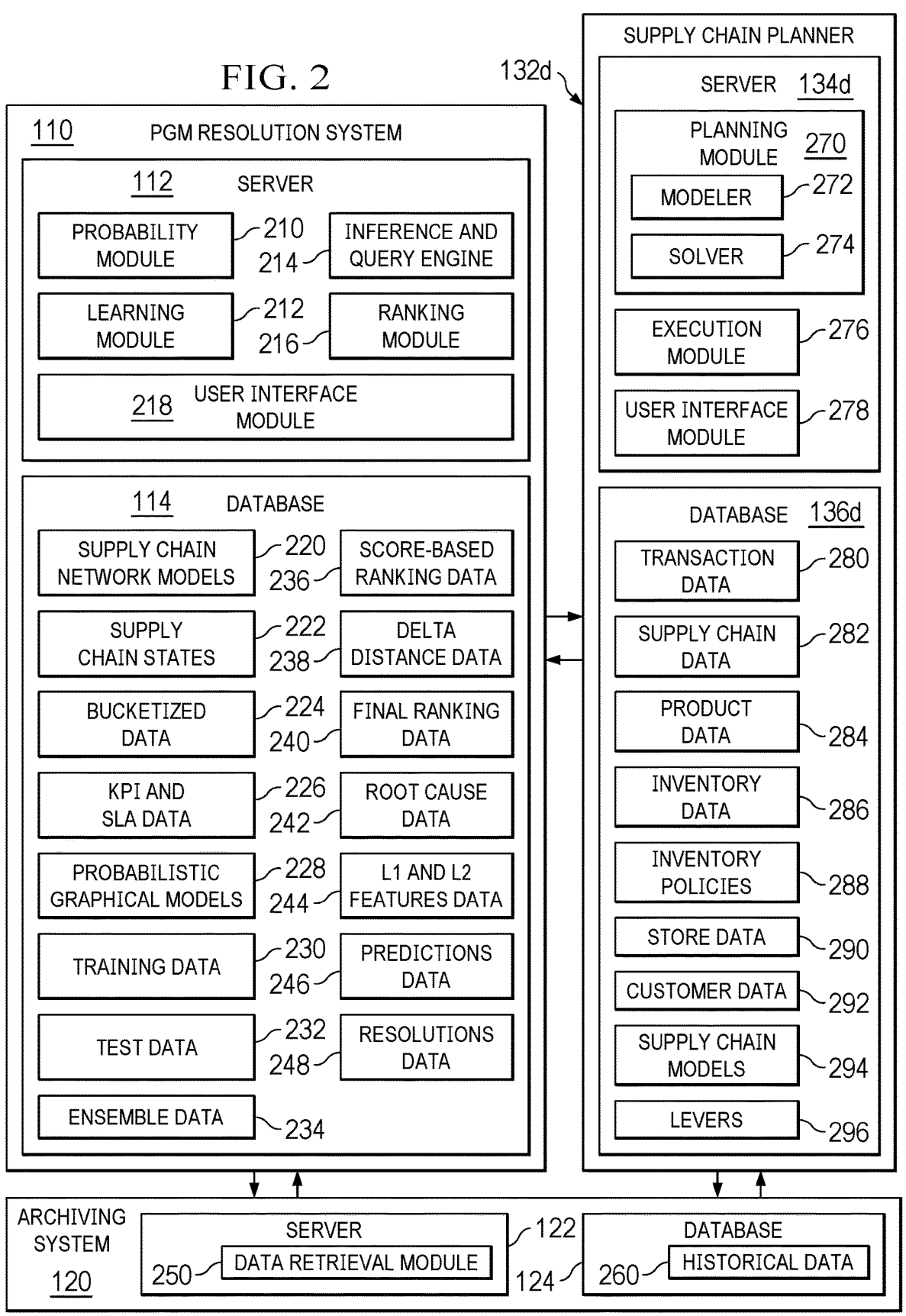
FIG. 2 illustrates the probabilistic graphical model resolution system, the archiving system, and the supply chain planner of FIG. 1 in greater detail, in accordance with an embodiment.

FIG. 2 illustrates PGM resolution system 110, archiving system 120, and supply chain planner 140 of FIG. 1 in greater detail, in accordance with an embodiment. PGM resolution system 110 comprises server 112 and database 114, as described above. Although PGM resolution system 110 is illustrated as comprising a single server 112 and a single database 114, embodiments contemplate any suitable number of servers 112 or databases 114 internal to or externally coupled with PGM resolution system 110.

Server 112 of PGM resolution system 110 comprises probability module 210, learning module 212, inference and query engine 214, ranking module 216, and user interface module 218. Although server 112 is illustrated and described as comprising a single probability module 210, a single learning module 212, a single inference and query engine 214, a single ranking module 216, and a single user interface module 218, embodiments contemplate any suitable number or combination of these located at one or more locations, local to, or remote from PGM resolution system 110, such as on multiple servers 112 or computers 170 at one or more locations in supply chain network 100.

Database 114 of PGM resolution system 110 may comprise one or more databases or other data storage arrangements at one or more locations, local to, or remote from, server 112. Database 114 of PGM resolution system 110 comprises, for example, supply chain network models 220, supply chain states 222, bucketized data 224, KPI and SLA data 226, one or more probabilistic graphical models 228, training data 230, test data 232, ensemble data 234, score-based ranking data 236, delta distance data 238, final ranking data 240, root cause data 242, L1 and L2 features data 244, predictions data 246, and resolutions data 248. Although database 114 of PGM resolution system 110 is illustrated and described as comprising supply chain network models 220, supply chain states 222, bucketized data 224, KPI and SLA data 226, probabilistic graphical models 228, training data 230, test data 232, ensemble data 234, score-based ranking data 236, delta distance data 238, final ranking data 240, root cause data 242, L1 and L2 features data 244, predictions data 246, and resolutions data 248, embodiments contemplate any suitable number or combination of these, located at one or more locations, local to, or remote from, PGM resolution system 110 according to particular needs.

In one embodiment, probability module 210 of PGM resolution system 110 constructs a graphical model from supply chain data 282, such as, for example, supply chain states 222 of database 114 of PGM resolution system 110, historical data 260 of archiving system 120, data of database 144 of supply chain planner 140 (such as, for example, supply chain data 282 or inventory data 286), and the like. The graphical model may comprise, for example, a Bayesian network. Probability module 210 identifies attributes of the supply chain to represent in the graphical model from supply chain data 282 and which will be used for probabilistic graphical model 228 constructed by learning module 212, as described in further detail below. By way of example only and not by way of limitation, identified attributes may include inventory stock at a particular location, the current or average volume of orders for a particular product from a particular location, and the like. Probability module 210 may construct a graphical model in which each node represents one of the identified attributes. While constructing the graphical model, probability module 210 may generate edges connecting each node in the graph, with further refinement removing edges when learning module 212 calculates that they do not represent relationships present in supply chain data 282.

Learning module 212 of PGM resolution system 110 refines the graphical model to generate probabilistic graphical model 228. Using one or more machine learning algorithms, learning module 212 identifies and models relationships between the nodes of the graphical model. Continuing the example above, when the graphical model is a Bayesian network, learning module 212 calculates the relationships between each node and stores a probability table for each node indicating the probabilistic relationship between related nodes. By way of explanation only and not by way of limitation, consider a simplified graphical model having two nodes, 'A,' and 'B.' If A is related to B, then the probability table for B will indicate the probability that B is true for both the situation that A is true and the situation that A is false. In addition, learning module 212 models probabilistic relationships between the nodes such as conditional probabilities, joint probabilities, and marginal probabilities. According to embodiments, learning module 212 learns the probability of an attribute given the probabilities of one or more related "upstream" attributes. Learning module 212 traverses a network of attribute nodes, and determines the structure of the relationships as well as the associated probabilities.

Inference and query engine 214 of PGM resolution system 110 evaluates queries against probabilistic graphical model 228. Inference and query engine 214 responds to queries formulated mathematically, that is, in a format compatible with probabilistic graphical model 228, such as, for example, query comprising one or more desired states for one or more metrics of the supply chain. Based on the requested desired states, inference and query engine 214 may traverse probabilistic graphical model 228 to determine changes to one or more attributes that would result in an increased probability of reaching the desired states. Inference and query engine 214 may respond to queries with recommendations of modifying the supply chain plan, applying lever 296, or adjusting the supply chain to increase the probability of reaching a desired state. In some embodiments, inference and query engine 214 sends recommendations to supply chain planner 140, which automatically modifies the supply chain plan, applies lever 296, or adjusts the supply chain to implement the recommendations.

Ranking module 216 of PGM resolution system 110 calculates a score and assigns a score-based rank to attributes of the supply chain. According to embodiments, the score-based rank establishes a hierarchy of attributes based, at least in part, on the score. Ranking module 216 may access PGM resolution system 110 database 114 and data stored therein, including but not limited to supply chain states 222, bucketized data 224, and/or one or more nodes of probabilistic graphical model 228, in order to establish a hierarchy of relevance to the overall system. In various embodiments, ranking module 216 calculates ranks for the attributes based on historical data 260 of the supply chain, current data of the supply chain, or an ensemble combination of historical and current data of the supply chain. Ranking module 216 may also measure a delta distance for attributes of the supply chain, meaning the distance between the current, or nearly current, state of a particular attribute and a desired or optimal state of that particular attribute. Ranking module 216 may then combine the score-based ranks and the delta distances to arrive at a final ranking for the attributes.

According to embodiments, user interface module 218 receives and processes a user input, such as, for example, input received by input device 172 of one or more computers 170. One or more computers 170 may transmit input to PGM resolution system 110 using one or more communication links 181-189. User interface module 218 may register the input from one or more computers 170 and transmit the input to the modules and engines of PGM resolution system 110. In an embodiment, user interface module 218 generates and displays a user interface (UI), such as, for example, a graphical user interface (GUI), that displays one or more interactive visualizations of data. User interface module 218 may generate one or more GUI displays. The one or more GUI displays may convey information, including supply chain plan data, segmentation data, and/or any other type of information about supply chain network 100 and segmentation. User interface module 218 display a GUI dashboard comprising visualizations of probabilistic graphical model 228, supply chain data 282, queries to probabilistic graphical model 228 as well as interactive visual elements that provide for user selection or adjustment of the values of variables to input into PGM resolution system 110, or user entry of queries. In response to input from the user, PGM resolution system 110 may calculate responses to queries including one or more recommendations of changes to be made to the supply chain via Supply chain planner 140. Further, the dashboard may display results of the query indicating, for example the probability of reaching a desired state of the supply chain currently, and the probability of reaching a desired state of the supply chain if the system recommendations are implemented. As described in further detail below, embodiments of PGM resolution system 110 provide a tool to identify the inputs having the greatest influence on one or more key performance indicators and may sort inputs according to the degree of their influence, variability, and risk likelihood.

Supply chain network models 220 represent the flow of materials through one or more supply chain entities 160 of supply chain network 100. As descried in more detail below, modeler 272 of planning module 270 of supply chain planner 140 may model the flow of materials through one or more supply chain entities 160 of supply chain network 100 as one or more supply chain network models 220 comprising a network of nodes and edges. The material storage and/or transition units are modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modelled as edges connecting the nodes. Each edge may represent the flow, transportation, or assembly of materials (such as items or resources) between the nodes by, for example, production processing or transportation. A planning horizon for supply chain network models 220 may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in supply chain network 100. Supply chain network models 220 may include any dynamic supply chain data 282, including for example, the one or more material constraints, one or more capacity constraints, lead times, yield rates, inventory levels, safety stock, demand dates, and/or the like. Although supply chain network models 220 are illustrated and described as comprising a network of nodes and edges, embodiments contemplate supply chain network models 220 comprising any suitable model that represents one or more components of supply chain network 100 using any suitable model, according to particular needs.

According to embodiments, supply chain network models 220 may model and display supply chain data 282 stored in supply chain planner 140 database 144 and/or archiving system 120 database 124. In an embodiment, supply chain network model 220 may model the flow of materials from upstream nodes to downstream nodes along each of the edges from left to right from, for example, raw materials to finished products. However, flows may be bidirectional, and one or more materials may flow from right to left, from a downstream node to an upstream node. Supply chain network 100 represented by supply chain network model 220 comprises material buffers storing materials or items, operations for processing materials and items, and resources which represent capacity limitations on each of the operations to which they are connected. Operations may have a single material or item as input and a single material or item as output. In addition, or as an alternative, a single operation may require two or more materials or items as input (i.e. materials or items stored at buffers) and produces one or more items as output (materials or items stored at buffers).

Supply chain network 100 represented by supply chain network model 220 may begin at the most upstream nodes representing material buffers, such as, for example, raw material buffers. Raw material buffers may receive the initial input for a manufacturing process. For example, raw materials may comprise metal, fabric, adhesives, polymers, and other materials and compounds required for manufacturing. The flow of materials from the upstream material buffers is indicated by the edges, which identify which of the operations is a possible destination for the materials. For example, raw materials may be transported to operations comprising a production process, such as producing one or more intermediate items from the raw materials which are stored at material buffers comprising, for example, intermediate items buffers. The operations are coupled by the edges with the resources to indicate that the operations require the resource in order to process items or materials. According to embodiments, the resources may include, for example, particular manufacturing, distribution, or transportation equipment and facilities, and other such resources utilized in the supply chain.

Limitations on supplying materials and items to particular buffers may represent transportation limitations (e.g. cost, time, available transportation options) or outputs of various operations (such as, for example, different production processes, which produce different items, each of which may be represented by a different SKU, and which each may be stored at different buffers). Although the limitation of the flow of items between nodes of supply chain network model 220 is described as cost, timing, transportation, or production limitations, embodiments contemplate any suitable flow of items or limitations of the flow of items between any one or more different nodes of supply chain network 100, according to particular needs. For the example manufacturing supply chain network 100, transportation processes may transport, package, or ship finished goods to one or more locations internal to or external of one or more supply chain entities 160 of supply chain network 100, including, for example, shipping directly to consumers, to regional or strategic distribution centers, or to the inventory of one or more supply chain entities 160, including, for example, to replenish a safety stock for one or more items in an inventory of one or more supply chain entities 160. Particular items and processes described herein comprise a simplified description for the purpose of illustration. For example, the items may be different sizes, styles, states of same or different physical material. Similarly, a process may be any process or operation, including manufacturing, distribution, transportation, or any other suitable activity of supply chain network 100. In one embodiment, additional constraints, such as, for example, business constraints, operation constraints, and resource constraints, may be added to facilitate other planning rules.

Although a simplified supply chain network model 220 is described as having a particular number of buffers, resources, and operations with a defined flow between them, embodiments contemplate any number of buffers, resources, and operations with any suitable flow between them, including any number of nodes and edges, according to particular needs. In particular, a supply chain planning problem typically comprises supply chain networks 100 much more complex than the simplified supply chain network models 220 described above. For example, supply chain network 100 often comprises multiple manufacturing plants located in different regions or countries. In addition, an item may be processed by many operations into a large number of different materials and items, where the different operations may have multiple constrained resources and multiple input items, each with their own lead, transportation, production, and cycle times. In addition, material may flow bidirectionally (either, upstream or downstream).

Supply chain states 222 of PGM resolution system 110 database 114 may comprise various metrics and data points representing the current state of the supply chain and historical states of the supply chain. Supply chain states 222 may include data collected from locations of the supply chain such as the stock of inventory at a location, the safety stock of inventory at a location, the total volume of demand for products in the supply chain, the demand at particular product/location combinations in the supply chain, and/or the like. In addition, or as an alternative, supply chain states 222 include various metrics measuring the performance of the supply chain, such as one or more KPIs or SLAs. In other embodiments, the data pertaining to KPIs and SLAs (or other target metrics) may be separately stored as KPI and SLA data 226. Supply chain states 222 may be used by probability module 210 to construct a graphical model of the supply chain represented by supply chain states 222.

According to embodiments, data representing supply chain states 222 may be bucketized by probability module 210 and stored as bucketized data 224. Probability module 210 may bucketize the data based on a functional grouping of the data in supply chain states 222. For example, probability module 210 may place all data points related to inventory stock into a "stock" bucket. Bucketized data 224 may further have one or more restrictions modeled that prevent data in one bucket having an effect on data in another bucket type. For example, if data is sorted into four temporal buckets (past, current, future, and time-agnostic), then restrictions are included in the model to prevent test data 232 effecting past data and future data effecting current or past data. When using time-bucketized data to construct probabilistic graphical model 228, past data nodes will be upstream of test data nodes, and test data nodes will be upstream of future data nodes.

KPI and SLA data 226 may relate to a current or historical state of a supply chain and its performance. KPI and SLA data 226 may also comprise one or more optimal or requested values for one or more features, attributes, other outputs, and/or supply chain entities 160 in supply chain network 100. According to embodiments, learning module 212 may use KPI and SLA data 226, in conjunction with supply chain states 222, to predict the probability of a particular KPI or SLA being attained based on the state of the supply chain. In addition, or in the alternative, learning module 212 creates and/or adjusts probabilistic graphical model 228 based, at least in part, on the predicted probabilities of attaining particular KPIs or SLAs.

Probabilistic graphical model 228 is, as disclosed above, a graph-based model, such as a Bayesian network, constructed to model the relationship and effect of attributes on the KPIs, SLAs, or other metrics of a supply chain. Probability module 210 constructs a graphical model based on supply chain states 222, bucketized data 224, and/or root cause data 242. Learning module 212 refines the graphical model by learning the probabilistic relationships between the nodes to construct probabilistic graphical model 228. In an embodiment, PGM resolution system 110 uses probabilistic graphical model 228 to respond to queries and make recommendations of changes to the supply chain to improve the probability of meeting one or more desired metrics, such as the KPIs or SLAs.

According to embodiments, probabilistic graphical model 228 may comprise a probabilistic database composed of probability tables for the attributes of supply chain network 100. PGM resolution system 110 may receive one or more queries, and the probabilistic database may respond to the queries by providing one or more insights. According to one embodiment, the query is sent to the probabilistic database. By way of further explanation only and not by way of limitation, the query may, for example, request, when given a first attribute in a first range, and a second attribute desired to be in a second range, the values for one or more other attributes. The response to the query provided by traversing the probabilistic database may be referred to as an inference or an insight into the way supply chain network 100 operates.

Training data 230 is used by probability module 210 and learning module 212 to train probabilistic graphical model 228. Training data 230 may include data such as supply chain states 222, bucketized data 224, KPI and SLA data 226, or other data related to the supply chain. In one embodiment, ranking module 216 uses training data 230 to determine score-based ranking data 236 for the attributes of the supply chain, based on the historical correlations between the attributes and the KPIs or the SLAs of the supply chain.

Test data 232 is data that is received by PGM resolution system 110 representing a current or near-current state of the supply chain. For example, test data 232 may be received by PGM resolution system 110, such as via supply chain planner 140, on a periodic basis. In other embodiments, test data 232 may be received by PGM resolution system 110 as part of a query sent to inference and query engine 214. Test data 232 may include data such as supply chain states 222, bucketized data 224, or other data related to the supply chain. In one embodiment, ranking module 216 uses test data 232 to determine score-based ranking data 236 for the attributes of the supply chain, based on the current correlations between the attributes and the KPIs or the SLAs of the supply chain.

Ensemble data 234 is a combination of training data 230 and test data 232, each as disclosed above. According to embodiments, ensemble data 234 provides PGM resolution system 110 with a more accurate representation of relevance of the various attributes than either training data 230 or test data 232 may provide alone. For example, if ranking module 216 uses only training data 230, the analysis may become static as the supply chain evolves, such as when new locations are added to the supply chain, or when conditions at existing locations change. Thus, a training data-only approach may fail to address recent changes to the supply chain. Test data 232 is by its nature more current than training data 230 is, but typically test data 232 represents a small sample size which would thus be subject to significant noise. The noise may introduce increased uncertainty in a test data-only approach. Further, using such a small sample size may lead to the model overfitting to test data 232.

When the modeled supply chain network 100 is highly similar to the historical supply chain network 100, ranking module 216 may use training data 230 scoring method. In contrast, ranking module 216 may use test data 232 scoring method may when the changes are instance-based, such as, for example, when given a new row or new data for a production time. In other embodiments, ranking module 216 may use ensemble data 234 scoring method to attain the benefits of training data 230 and test data 232, while avoiding the limitations of both. In one embodiment, ranking module 216 uses ensemble data 234 to determine score-based ranking data 236 for the attributes of the supply chain, based on both the historical correlations and the current correlations between the attributes and the KPIs or the SLAs of the supply chain.

Score-based ranking data 236 is, as described above, a ranking of the relative importance of the features and/or attributes of the supply chain, in terms of the impact each feature and/or attribute has on the KPI or SLA in question. A separate score-based ranking may be prepared for every KPI relevant to a query. That is, for a first KPI, attributes related to inventory stock may have the largest impact on the first KPI, while for a second KPI, features and/or attributes related to order volume may have the largest impact on the second KPI.

Delta distance data 238 is data indicating the difference between a current state of the features and/or attributes and a desired or optimal state of the features and/or attributes. Ranking module 216 may traverse probabilistic graphical model 228 to determine the optimal value of each supply chain feature or attribute in order to maximize the probability of reaching the desired value for the relevant KPI. For example, if a query sent to inference and query engine 214 seeks changes to the supply chain in order to meet an SLA of 80%, ranking module 216 traverses probabilistic graphical model 228 to determine the optimal value of each feature or attribute of the supply chain that would result in a maximized probability of achieving the specified SLA of 80%. Then, by comparing the current state of the attributes to these optimal states, a delta distance for each attribute may be calculated. If the data is discretized, such as by being binned, then the delta distance may be a whole number indicating the number of bins from optimal the attribute is currently in.

Final ranking data 240 comprises data ranking the feature and/or attributes used to qualify final rankings and make recommendations. According to embodiments, final ranking data 240 is based, at least in part, on score-based ranking data 236 and delta distance data 238. Final rankings may indicate a hierarchy of features or attributes sorted by the magnitude of change each feature or attribute will cause for the KPI or SLA of the supply chain, given a current state of the supply chain. In one embodiment, PGM resolution system 110 calculates final ranking data 240 by sorting the features or attributes by absolute values for delta distance, (that is, the attributes furthest from their optimal states being first), with any ties in this ranking being broken by the score-based rank of the tied features or attributes. That is, if two features/attributes have a delta distance with magnitude equal to two 2 (such as, for example, two and −negative two, respectively), the feature/attribute with the highest score-based rank would then be ranked higher in the final rankings stored in final ranking data 240. Embodiments contemplate other possible methods of combining score-based ranking data 236 and delta distance data 238, such as, for example, a score-based rank-first approach, with ties being broken by delta distance, or a statistical combinations of the delta distance and score-based ranking data 236. Inference and query engine 214 may use the final ranking in determining attributes of the supply chain to recommend changes, when responding to a query.

In other embodiments, different mechanisms for determining the final rankings may be appropriate. For example, in certain situations, a user of PGM resolution system 110 may have limited control or authority to enact all changes to the supply chain. In such a situation, the final rankings may instead be based on a calculation (or numerical approximation where appropriate) of attributes of the supply chain that have the largest impact on the desired supply chain metric with the smallest movement. That is, the final rankings may be based on a relative impact of the attributes rather than an absolute impact. In other cases, ranking module 216 may obtain data from supply chain planner 140 indicating which features or attributes of the supply chain can be modified, such as inventory policies 288, store data 290, customer data 292, supply chain models 294, or others. Using such data, ranking module 216 may exclude features or attributes which the user or PGM resolution system 110 cannot change from the final rankings. Another possible mechanism for determining the final ranking is to sort the features or attributes by which attributes can be changed the most. For example, in some supply chain systems, change management procedures may prevent any change over a certain size from happening, and the threshold for allowing changes may be different for different features or attributes. In such systems it may be preferable to provide to supply chain planner 140 a list that prioritizes changes that are possible under the controlling change management procedures, rather than suggesting changes which would have a large impact but cannot be performed.

Root cause data 242 is a set of attributes associated with a particular state or metric in the supply chain, as the root cause of that state. In some embodiments inference and query engine 214 may respond to a query seeking to uncover the root cause of a particular state in the supply chain, such as a particular metric falling below a threshold. In such a case, inference and query engine 214 may traverse probabilistic graphical model 228 to identify the features or attributes that have the largest impact on that metric, and store those features or attributes as root cause data 242. In such embodiments ranking module 216 may rank root cause data 242 to sort root cause data 242 by which attribute had the largest impact on the metric in question.

Embodiments contemplate grouping features into any suitable categories using, for example, K percentile features (ranking the features according to the K percentile), top K % contributors (ranking the features according to the top K %), functional grouping (dictionary mapping to relate features placed together in a category such as, for example, business knowledge), and the like. Although particular methods of feature categorization are shown and described, embodiments contemplate using other suitable feature categorization methods, according to particular needs.

L1 and L2 features data 244 may store data 290 relating to L1 and L2 features generated by ranking module 216. Predictions data 246 may store one or more predictions generated by inference and query engine 214. Resolutions data 248 may store one or more resolution actions which alter the values or variables of one or more features, attributes, and/or supply chain entities 160 to improve the performance of one or more KPIs and/or SLAs.

As disclosed above, archiving system 120 comprises server 122 and database 124. Although archiving system 120 is illustrated as comprising a single server 122 and a single database 124, embodiments contemplate any suitable number of servers 122 or databases 124 internal to or externally coupled with archiving system 120.

Server 122 of archiving system 120 comprises data retrieval module 250. Although server 122 is illustrated and described as comprising a single data retrieval module 250, embodiments contemplate any suitable number or combination of data retrieval modules 250 located at one or more locations, local to, or remote from archiving system 120, such as on multiple servers 122 or computers 170 at one or more locations in supply chain network 100.

In one embodiment, data retrieval module 250 of archiving system 120 receives historical data 260 from transportation network 130, warehouse management system 133, inventory system 136, supply chain planner 140 and one or more supply chain entities 160 and stores the received historical data 260 in database 124. According to one embodiment, data retrieval module 250 may prepare historical data 260 for use by supply chain planner 140 to generate variants of the supply chain planning problem by checking the historical supply chain data 282 for errors and transforming the historical supply chain data 282 to normalize, aggregate, and/or rescale the historical supply chain data 282 to allow direct comparison of data received from different transportation networks 130, warehouse management systems 133, inventory systems 136, supply chain planners 140 and one or more supply chain entities 160 at one or more other locations local to, or remote from, archiving system 120. According to embodiments, data retrieval module 250 receives data from one or more sources external to supply chain network 100, such as, for example, weather data, special events data, social media data, calendars, and the like and stores the received data as historical data 260.

Database 124 of archiving system 120 may comprise one or more databases or other data storage arrangements at one or more locations, local to, or remote from, server 122. Database 124 of archiving system 120 comprises, for example, historical data 260. Although database 124 of archiving system 120 is illustrated and described as comprising historical data 260, embodiments contemplate any suitable number or combination of data, located at one or more locations, local to, or remote from, archiving system 120, according to particular needs.

Historical data 260 is received from PGM resolution system 110, archiving system 120, transportation network 130, warehouse management system 133, inventory system 136, supply chain planner 140, one or more supply chain entities 160, computer 170, and/or one or more locations local to, or remote from, supply chain network 100, such as, for example, weather data, special events data, social media data, calendars, and the like. According to one embodiment, historical data 260 comprises historic sales patterns, prices, promotions, weather conditions and other factors influencing demand of one or more items sold in one or more stores over a time period, such as, for example, one or more days, weeks, months, years, including, for example, a day of the week, a day of the month, a day of the year, week of the month, week of the year, month of the year, special events, paydays, and the like. When generating variants of the supply chain planning problem, supply chain planner 140 may calculate supply chain plans over a historical time period, such as, for example, any of the time periods represented by historical data 260.

As disclosed above, supply chain planner 140 may comprise supply chain planner 140 comprising server 142 and database 144. Although supply chain planner 140 is illustrated as comprising a single server 142 and a single database 144, embodiments contemplate any suitable number of servers 142 or databases 144 internal to or externally coupled with supply chain planner 140.

Server 142 of supply chain planner 140 comprises planning module 270, the execution module 276, and user interface module 278. Although server 142 is illustrated and described as comprising a single planning module 270, a single execution module 276, and a single user interface module 278, embodiments contemplate any suitable number or combination of planning modules 270, execution modules 276, and user interface modules 278, located at one or more locations, local to, or remote from supply chain planner 140, such as on multiple servers 142 or computers 170 at one or more locations in supply chain network 100.

Database 144 of supply chain planner 140 may comprise one or more databases or other data storage arrangements at one or more locations, local to, or remote from, server 142. Database 144 of supply chain planner 140 comprises, for example, transaction data 280, supply chain data 282, product data 284, inventory data 286, inventory policies 288, store data 290, customer data 292, supply chain models 294, and levers 296. Although database 144 of supply chain planner 140 is illustrated and described as comprising transaction data 280, supply chain data 282, product data 284, inventory data 286, inventory policies 288, store data 290, customer data 292, supply chain models 294, and levers 296, embodiments contemplate any suitable number or combination of data, located at one or more locations, local to, or remote from, supply chain supply chain planner 140, according to particular needs.

Planning module 270 comprises modeler 272 and solver 274. Although planning module 270 is illustrated and described as comprising a single modeler 272 and solver 274, embodiments contemplate any suitable number or combination of these located at one or more locations, local to, or remote from planning module 270, such as on multiple servers 142 or computers 170 at any location in supply chain network 100.

Modeler 272 may model one or more supply chain planning problems of supply chain network 100. According to one embodiment, modeler 272 of server 142 identifies resources, operations, buffers, and pathways, and maps supply chain network 100 using supply chain network models 220, as disclosed above. For example, modeler 272 of server 142 models a supply chain planning problem that represents supply chain network 100 as supply chain network model 220, an LP optimization problem, or other type of input to a supply chain solver 274. As disclosed above, embodiments contemplate modeler 272 providing supply chain network model 220 to PGM resolution system 110.

According to embodiments, solver 274 of planning module 270 generates a solution to a supply chain planning problem. The supply chain solver 274 may comprise an LP optimization solver, a heuristic solver, a mixed-integer problem solver, a MAP solver, an LP solver, a Deep Tree solver, and the like.

The execution module 276 executes one or more supply chain processes such as, for example, instructing automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 160, and the configuration and quantity of packaging and shipping of items based on a supply chain plan, the number of items currently in stock at one or more supply chain entities 160, the number of items currently in transit in transportation network 130, a forecasted demand, a supply chain disruption, a material or capacity reallocation, current and projected inventory levels at one or more stocking locations, root cause data 242, a selected lever, and/or one or more additional factors described herein. For example, the execution module 276 may send instructions to the automated machinery to locate items to add to or remove from an inventory of or shipment for one or more supply chain entities 160.

User interface module 218 of supply chain planner 140 generates and displays a UI, such as, for example, a GUI, that displays one or more interactive visualizations of transaction data 280, supply chain data 282, product data 284, inventory data 286, inventory policies 288, store data 290, customer data 292, supply chain models 294, and levers 296. According to embodiments, user interface module 218 displays a GUI comprising interactive graphical elements for selecting one or more supply chain network 100 components, modeling supply chain network 100 as an object model, formulating supply chain network 100 as a supply chain planning problem, solving the supply chain planning problem, displaying predictions from PGM resolution system 110, displaying and providing for selection of one or more levers 296, and displaying one or more solutions or supply chain plans.

Transaction data 280 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 280 is represented by any suitable combination of values and dimensions, aggregated or un-aggregated, such as, for example, sales per week, sales per week per location, sales per day, sales per day per season, or the like.

Supply chain data 282 may comprise any data of one or more supply chain entities 160 including, for example, item data, identifiers, metadata (comprising dimensions, hierarchies, levels, members, attributes, cluster information, and member attribute values), fact data (comprising measure values for combinations of members) of one or more supply chain entities 160. Supply chain data 282 may also comprise for example, various decision variables, business constraints, goals, and objectives of one or more supply chain entities 160. According to some embodiments, supply chain data 282 may comprise hierarchical objectives specified by, for example, business rules, master planning requirements, scheduling constraints, and discrete constraints, including, for example, sequence dependent setup times, lot-sizing, storage, shelf life, and the like.

Product data 284 of database 144 may comprise products identified by, for example, a product identifier (such as a Stock Keeping Unit (SKU), Universal Product Code (UPC) or the like), and one or more attributes and attribute types associated with the product ID. Product data 284 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 286 of database 144 may comprise any data relating to current or projected inventory quantities or states, order rules, or the like. For example, inventory data 286 may comprise the current level of inventory for each item at one or more stocking points across supply chain network 100. In addition, inventory data 286 may comprise order rules that describe one or more rules or limits on setting an inventory policy, including, but not limited to, a minimum order volume, a maximum order volume, a discount, and a step-size order volume, and batch quantity rules. According to some embodiments, supply chain planner 140 accesses and stores inventory data 286 in database 144, which may be used by supply chain planner 140 to place orders, set inventory levels at one or more stocking points, initiate manufacturing of one or more components, or the like in response to, and based at least in part on, a supply chain plan or other output of supply chain planner 140. In addition, or as an alternative, inventory data 286 may be updated by receiving current item quantities, mappings, or locations from transportation network 130, warehouse management system 133, inventory system 136, supply chain planner 140 and/or one or more networked imaging devices 150.

Inventory policies 288 of database 144 may comprise any suitable inventory policy describing the reorder point and target quantity, or other inventory policy parameters that set rules for supply chain planner 140 to manage and reorder inventory. Inventory policies 288 may be based on target service level, demand, cost, fill rate, or the like. According to embodiment, inventory policies 288 comprise target service levels that ensure that a service level of one or more supply chain entities 160 is met with a certain probability. For example, one or more supply chain entities 160 may set a service level at 95%, meaning one or more supply chain entities 160 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, PGM resolution system 110 and/or supply chain planner 140 may determine a replenishment order according to one or more replenishment rules, which, among other things, indicates to one or more supply chain entities 160 to determine or receive inventory to replace the depleted inventory. By way of example and not of limitation, an inventory policy for non-perishable goods with linear holding and shorting costs comprises a min./max. (s,S) inventory policy. Other inventory policies 288 may be used for perishable goods, such as fruit, vegetables, dairy, fresh meat, as well as electronics, fashion, and similar items for which demand drops significantly after a next generation of electronic devices or a new season of fashion is released.

Store data 290 may comprise data describing the stores of one or more retailers and related store information. Store data 290 may comprise, for example, a store ID, store description, store location details, store location climate, store type, store opening date, lifestyle, store area (expressed in, for example, square feet, square meters, or other suitable measurement), latitude, longitude, and other similar data. Store data 290 may include demand forecasts for each store indicating future expected demand based on, for example, any data relating to past sales, past demand, purchase data, promotions, events, or the like of one or more supply chain entities 160. The demand forecasts may cover a time interval such as, for example, by the minute, hour, daily, weekly, monthly, quarterly, yearly, or any suitable time interval, including substantially in real time. Although demand forecasts are described as comprising a particular store, supply chain planner 140 may calculate a demand forecast at any granularity of time, customer, item, region, or the like.

Customer data 292 may comprise customer identity information, including, for example, customer relationship management data, loyalty programs, and mappings between one or more customers and transactions associated with those one or more customers such as, for example, product purchases, product returns, customer shopping behavior, and the like. Customer data 292 may comprise data relating customer purchases to one or more products, geographical regions, store locations, time period, or other types of dimensions.

Supply chain models 294 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 294 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model.

Figure 3:
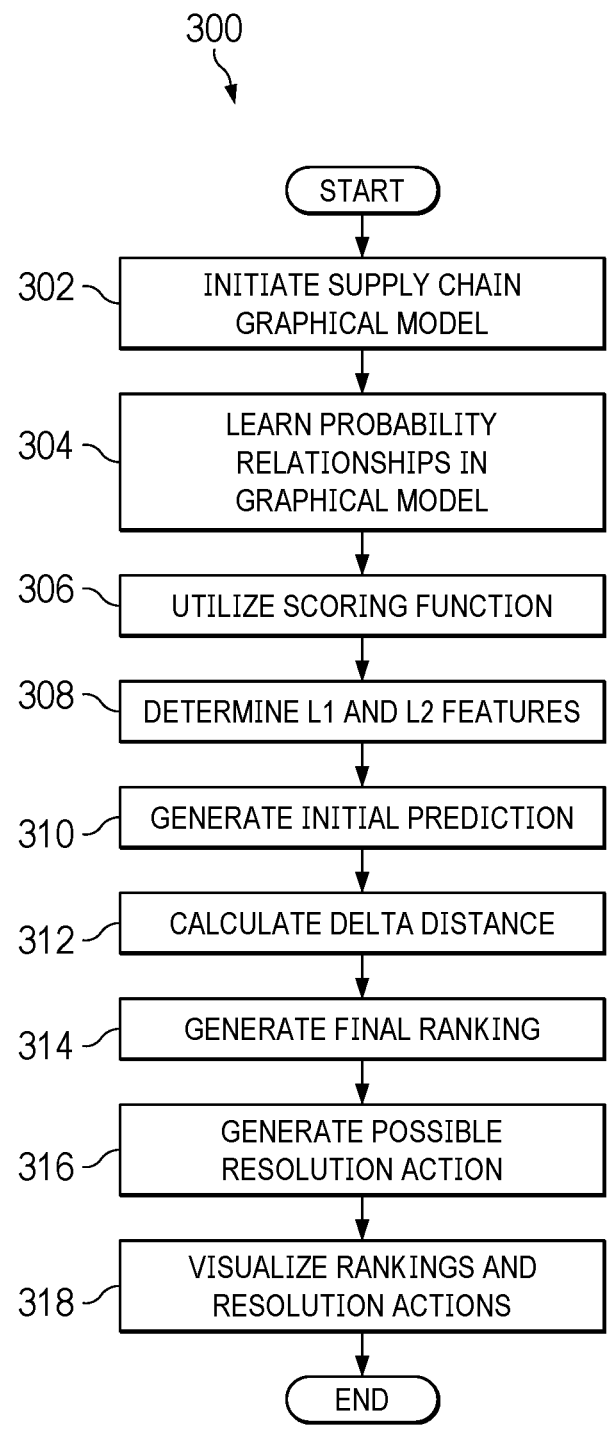
FIG. 3 illustrates a method of using a probabilistic graphical model and mutual information to generate resolution recommendations and graphical visualizations, according to an embodiment.

FIG. 3 illustrates mutual information resolution method 300 of using probabilistic graphical model 228 and mutual information to generate resolution recommendations and graphical visualizations, according to an embodiment. Mutual information resolution method 300 comprises one or more activities, which although described in a particular order may be implemented in one or more combinations, according to particular needs.

At activity 302 of mutual information resolution method 300, PGM resolution system 110 probability module 210 and learning module 212 initialize a graphical model of a supply chain. The graphical model may be based on a set of data representing the historical states of the supply chain using training data 230, such as inventory stock, order volume, distribution center capacity, production ratios, logistical landscapes, and/or other measures, which may be referred to as supply chain attributes and/or supply chain features. Attributes and/or features may vary and correspond to one or more supply chain locations. By way of example only and not by way of limitation, a supply chain location may comprise, for example, one or more supply chain entities 160 (e.g. factories, warehouses, distribution centers, and the like), stocking locations, or any other locations where products may be produced, stored, or transported. In one embodiment, supply chain data 282 is obtained from supply chain network models 220 of supply chain planner 140. Embodiments further contemplate the supply chain graphical model comprising a directed graph, such as a Bayesian network. The graphical model may be initialized as network 180 of nodes, wherein each node corresponds to one or more attributes of supply chain data 282 and coupled by edges connecting the nodes and emphasizing the relationships between the nodes. Having initialized a graphical model of the supply chain, including supply chain features, probability module 210 and learning module 212 store the graphical model and supply chain features in supply chain network models 220.

At activity 304 of mutual information resolution method 300, PGM resolution system 110 constructs probabilistic graphical model 228 by learning the probability relationships between the nodes of the graphical model using training data 230. Probability module 210 and learning module 212 may access the graphical model stored in supply chain network models 220 and may use the graphical model to construct probabilistic graphical model 228. According to embodiments, probability module 210 and learning module 212 determine which features or attributes of the supply chain (each feature or attribute represented by a node of the graphical model) impact other features attributes of the supply chain and the impact on the KPIs, SLAs, and/or other metrics used to measure the performance or productivity of the supply chain. As described above, each node of probabilistic graphical model 228 is associated with a probability table that describes the edges shared with other nodes and the probability relationship between the nodes. Having constructed probabilistic graphical model 228, probability module 210 and learning module 212 store probabilistic graphical model 228 in probabilistic graphical models 228 of database 114.

At activity 306 of mutual information resolution method 300, ranking module 216 utilizes a scoring function to calculate a score-based rank for the features or attributes of the supply chain system by traversing probabilistic graphical model 228. In addition, or as an alternative, PGM resolution system 110 bucketizes the features or attributes to create groups of features or attributes, such as, for example, one or more functional groupings of features or attributes. In an embodiment, ranking module 216 utilizes the following equation (1), training data 230, and mutual information stored in probabilistic graphical model 228 to determine the significance and the ordering of the features or attributes, stored in supply chain network models 220, that comprise the supply chain:

$$I(U;C) = \sum_{e_t \in \{1,0\}} \sum_{e_c \in \{1,0\}} P(U = e_t, C = e_c) \log_2 \frac{P(U = e_t, C = e_c)}{P(U = e_t) P(C = e_c)}, \quad (1)$$

In an embodiment, ranking module 216 may use equation (1) above to calculate differences between features and to determine information shared between variables and the connections between variables and associated features or attributes. Ranking module 216 may store the calculated score-based ranks for the features and/or attributes of the supply chain system, including but not limited to mutual information stored in probabilistic graphical model 228 determining the significance and ordering of features and attributes, in score-based ranking data 236.

At activity 308 of mutual information resolution method 300, ranking module 216 determines L1 and L2 features from score-based ranking data 236 and the one or more probabilistic graphical models 228. In an embodiment, L1 may refer to one or more level one features (connected to a root node by a single direct connection or edge). L2 may refer to one or more level two features (connected to an L1 node by a single direct connection or edge), and so on. Having calculated L1 and L2 features, ranking module 216 stores the L1 and L2 features in L1 and L2 features data 244.

At activity 310 of mutual information resolution method 300, inference and query engine 214 generates an initial prediction using test data 232. In an embodiment, inference and query engine 214 accesses probabilistic graphical model 228 stored in probabilistic graphical model 228 s 228 of database 114, score-based ranking data 236, and L1 and L2 features data 244, and applies test data 232 to probabilistic graphical model 228, score-based ranking data 236, and L1 and L2 features data 244 to generate one or more initial predictions. Inference and query engine 214 stores the one or more initial predictions in predictions data 246 of database 114. In an embodiment, the initial predictions based on test data 232 may indicate the predicted chance that supply chain network 100 will successfully fulfill—or fail to fulfill—one or more KPIs, SLAs, and/or other objectives given test data 232. The initial predictions may record the predicted chance as a decimal value (such as, for example, SLA<0.8 indicating a less than 80% chance that the supply chain will successfully fulfill the SLA in question).

At activity 312 of mutual information resolution method 300, ranking module 216 calculates the delta distance for the features, attributes, or buckets as calculated in the initial prediction, based on test data 232, versus one or more optimal values for the features, attributes, or buckets stored in KPI and SLA data 226. In one embodiment, ranking module 216 determines an optimal value for the features, attributes, or buckets of the supply chain system using an ensemble of training data 230 and test data 232 to maximize the probability of achieving the threshold of the KPI, SLA, and/or other objectives. Ranking module 216 may compare these optimal states to the current value of those attributes to determine the delta distance for the features, attributes, or buckets, using L1 and L2 features data 244 to ensure ranking module 216 is only comparing features that are relevant to the KPIs or SLAs that may not be successfully fulfilled according to the initial predictions. The delta distance may specify the distance that one or more features, attributes, and/or other supply chain variables need to move or be changed to bring the sub-performing KPIs and SLAs up to optimal values. Ranking module 216 may store the delta distance information in delta distance data 238.

At activity 314 of mutual information resolution method 300, ranking module 216 generates a final ranking. The final ranking may be based on the score-based ranking and the delta distances for the features and/or attributes. In one embodiment, the final ranking comprises the features and/or attributes sorted first by largest absolute delta distance, with any ties being broken by the feature and/or attribute with the higher-priority score-based ranking. In another embodiment, the final ranking may be limited to features and/or attributes over which transformations or other changes can be performed. For example, in some situations it may not be possible to alter the available stock at a particular location. In such a situation, attributes relating to stock at that location, or the stock bucket for that location, may be omitted from the final ranking. In an embodiment, ranking module 216 may utilize equation (1) as described above, test data 232, score-based ranking data 236, and L1 and L2 features data 244 to generate final rankings. The final rankings may comprise (1) final rankings for one or more features and/or attributes that specify the order of importance of each feature and/or attribute on affecting the one or more KPIs and/or SLAs that are not successfully fulfilled, as well as (2) one or more values at which the one or more features and/or attributes should be set at or changed to in order to affect change in the supply chain as efficiently as possible and to bring the one or more KPIs and/or SLAs that were not successfully fulfilled towards optimal values. Having generated final rankings, ranking module 216 store the final rankings in final ranking data 240. In an embodiment, PGM resolution system 110 may use a hierarchical method, described in greater detail below in relation to FIG. 8, to generate rankings and to assign L1/L2 rankings to features.

At activity 316 of mutual information resolution method 300, inference and query engine 214 generates possible resolution actions. In an embodiment, inference and query engine 214 accesses probabilistic graphical models 228 of database 114, score-based ranking data 236, L1 and L2 features data 244, delta distance data 238, and final ranking data 240, and generates one or more resolution actions to better fulfill the one or more KPIs and/or SLAs that are not successfully fulfilled by altering the values of one or more features and/or attributes based on score-based ranking data 236, delta distance data 238, and final ranking data 240 of the one or more features and/or attributes. For example, in an embodiment in which a supply chain manufacturer can only produce 90% of a requested manufacturing quota, PGM resolution system 110 executing the actions of mutual information resolution method 300 may determine that increasing available manufacturing stock at the supply chain manufacturer by 30% will enable the supply chain manufacturer to produce 99% of the requested manufacturing quota, and inference and query engine 214 may generate "increase available manufacturing stock at the supply chain manufacturer by 30%" as a possible resolution action. Having generated one or more resolution actions, inference and query engine 214 may store the resolution actions in resolutions data 248 of database 114.

At activity 318 of mutual information resolution method 300, user interface module 218 visualizes the rankings and resolution actions by generating one or more GUI displays. According to embodiments, user interface module 218 may access any data stored in PGM resolution system 110 database 114, including but not limited to probabilistic graphical models 228, score-based ranking data 236, L1 and L2 features data 244, delta distance data 238, and final ranking data 240, and may generate any GUI displays in any configuration to display the data stored in PGM resolution system 110 database 114. By way of example only and not by way of limitation, user interface module 218 may generate, according to embodiments, risk mitigation GUI display 400, illustrated by FIG. 4; Bayesian network GUI display 500, illustrated by FIGS. 5A-5B; resolution recommendation GUI display 600, illustrated by FIGS. 6A-6B; mutual information location GUI display 700, illustrated by FIG. 7; and/or hierarchical GUI display 900, illustrated by FIG. 9. Having generated and displayed one or more GUI displays to visualize rankings and resolution actions, PGM resolution system 110 terminates mutual information resolution method 300.

To illustrate the activities of PGM resolution system 110 executing mutual information resolution method 300, the following example is provided. In this example, PGM resolution system 110 executes the activities of mutual information resolution method 300 to identify four features, and values associated with the four features, that will most directly resolve an identified out-of-stock problem at a supply chain retailer (for the purposes of this example, "Retailer X"). Although the provided example illustrates PGM resolution system 110 executing the activities of mutual information resolution method 300 in a particular order, embodiments not illustrated by the provided example contemplate PGM resolution system 110 and method executing the activities of mutual information resolution method 300 in any order, according to particular needs.

In this example, at activity 302 of mutual information resolution method 300, PGM resolution system 110 probability module 210 and learning module 212 initialize a graphical model of the supply chain (henceforth "Supply Chain Y") in which Retailer X operates, including Supply Chain Y features within the graphical model. The graphical model of Supply Chain Y comprises network 180 of nodes wherein each node corresponds to one or more attributes and/or features of supply chain data 282 and coupled by edges connecting the nodes and emphasizing the relationships between the nodes. Having initialized a graphical model of Supply Chain Y, including Supply Chain Y features, probability module 210 and learning module 212 store the graphical model and supply chain features in supply chain network models 220.

Continuing the example, at activity 304 of mutual information resolution method 300, PGM resolution system 110 constructs probabilistic graphical model 228 of Supply Chain Y by learning the probability relationships between the nodes of the Supply Chain Y graphical model using training data 230. Probability module 210 and learning module 212 access the Supply Chain Y graphical model stored in supply chain network models 220 and use the Supply Chain Y graphical model to construct a Supply Chain Y probabilistic graphical model. Probability module 210 and learning module 212 determine which features or attributes of Supply Chain Y (each feature or attribute represented by a node of the graphical model) impact other features attributes of Supply Chain Y and the impact on the KPIs, SLAs, and/or other metrics used to measure the performance or productivity of Supply Chain Y. Having constructed the Supply Chain Y probabilistic graphical model, probability module 210 and learning module 212 store the Supply Chain Y probabilistic graphical model in probabilistic graphical models 228 of database 114.

Continuing the example, at activity 306 of mutual information resolution method 300, ranking module 216 utilizes a scoring function to calculate a score-based rank for the features or attributes of Supply Chain Y by traversing the Supply Chain Y probabilistic graphical model. In this example, ranking module 216 utilizes equation (1) as described above, training data 230, and mutual information stored in the Supply Chain Y probabilistic graphical model to determine the significance and the ordering of the Supply Chain Y features or attributes, stored in supply chain network models 220, that comprise Supply Chain Y. Ranking module 216 uses equation (1) to calculate differences between features and to determine information shared between variables and the connections between variables and associated features or attributes in Supply Chain Y. Ranking module 216 may store the calculated score-based ranks for the features and/or attributes of Supply Chain Y, including but not limited to mutual information stored in the Supply Chain Y probabilistic graphical model determining the significance and ordering of features and attributes, in score-based ranking data 236.

Continuing the example, at activity 308 of mutual information resolution method 300, ranking module 216 determines L1 and L2 features from score-based ranking data 236 and the Supply Chain Y probabilistic graphical model. Having calculated L1 and L2 features, ranking module 216 stores the L1 and L2 features in L1 and L2 features data 244.

Continuing the example, at activity 310 of mutual information resolution method 300, inference and query engine 214 generates an initial Supply Chain Y and Retailer X feature prediction using test data 232. Inference and query engine 214 accesses the Supply Chain Y probabilistic graphical model, score-based ranking data 236, and L1 and L2 features data 244, and applies test data 232 to the Supply Chain Y probabilistic graphical model, score-based ranking data 236, and L1 and L2 features data 244 to generate one or more initial Supply Chain Y predictions and to determine whether the outputs of Supply Chain Y and Retailer X within Supply Chain Y will meet desired features and targets (henceforth, the "Desired Supply Chain Y Features"). Inference and query engine 214 stores the one or more initial Supply Chain Y/Retailer X predictions in predictions data 246 of database 114. In this example, the initial Supply Chain Y/Retailer X predictions indicate that Retailer X will sell only 70% of the targeted number of products within Supply Chain Y, given the current state of features, attributes, and other variables in Supply Chain Y (henceforth, the "Current Supply Chain Y Features").

Continuing the example, at activity 312 of mutual information resolution method 300, ranking module 216 calculates the delta distance for the Current Supply Chain Y Features, based on test data 232, versus the Desired Supply Chain Y Features stored in KPI and SLA data 226. In this example, the delta distance specifies the distance that one or more Supply Chain Y and Retailer X features, attributes, and/or other Supply Chain Y/Retailer X variables need to move or be changed to bring the sub-performing Retailer X sales (which were predicted to reach only 70% of the target number) up to desired values. Ranking module 216 stores store the delta distance information in delta distance data 238.

Continuing the example, at activity 314 of mutual information resolution method 300, ranking module 216 generates a final ranking. In this example, the final ranking comprises Supply Chain Y/Retailer X features 406a-406g sorted first by largest absolute delta distance, with any ties being broken by the feature with the higher-priority score-based ranking. Ranking module 216 utilizes equation (1) as described above, test data 232, score-based ranking data 236, and L1 and L2 features data 244 to generate final rankings. The final rankings comprise (1) final rankings for one or more Supply Chain Y/Retailer X features 406a-406g that specify the order of importance of each feature affecting the Retailer X sales target numbers that are not successfully fulfilled, as well as (2) one or more values at which the one or more Supply Chain Y/Retailer X features 406a-406g should be set at or changed to in order to affect change in Supply Chain Y and boost the product sales at Retailer X as efficiently as possible. Having generated final rankings, ranking module 216 store the final rankings in final ranking data 240.

Continuing the example, at activity 316 of mutual information resolution method 300, inference and query engine 214 generates possible resolution actions for Retailer X to boost product sales. In an embodiment, inference and query engine 214 accesses the Supply Chain Y probabilistic graphical model, score-based ranking data 236, L1 and L2 features data 244, delta distance data 238, and final ranking data 240, and generates one or more resolution actions for Retailer X to better fulfill the one or more KPIs and/or SLAs that are not successfully fulfilled by altering the values of one or more Supply Chain Y/Retailer X features 406a-406g based on score-based ranking data 236, delta distance data 238, and final ranking data 240 of the one or more features. Having generated Supply Chain Y/Retailer X resolution actions, inference and query engine 214 stores the Supply Chain Y/Retailer X resolution actions in resolutions data 248 of database 114.

Figure 4:
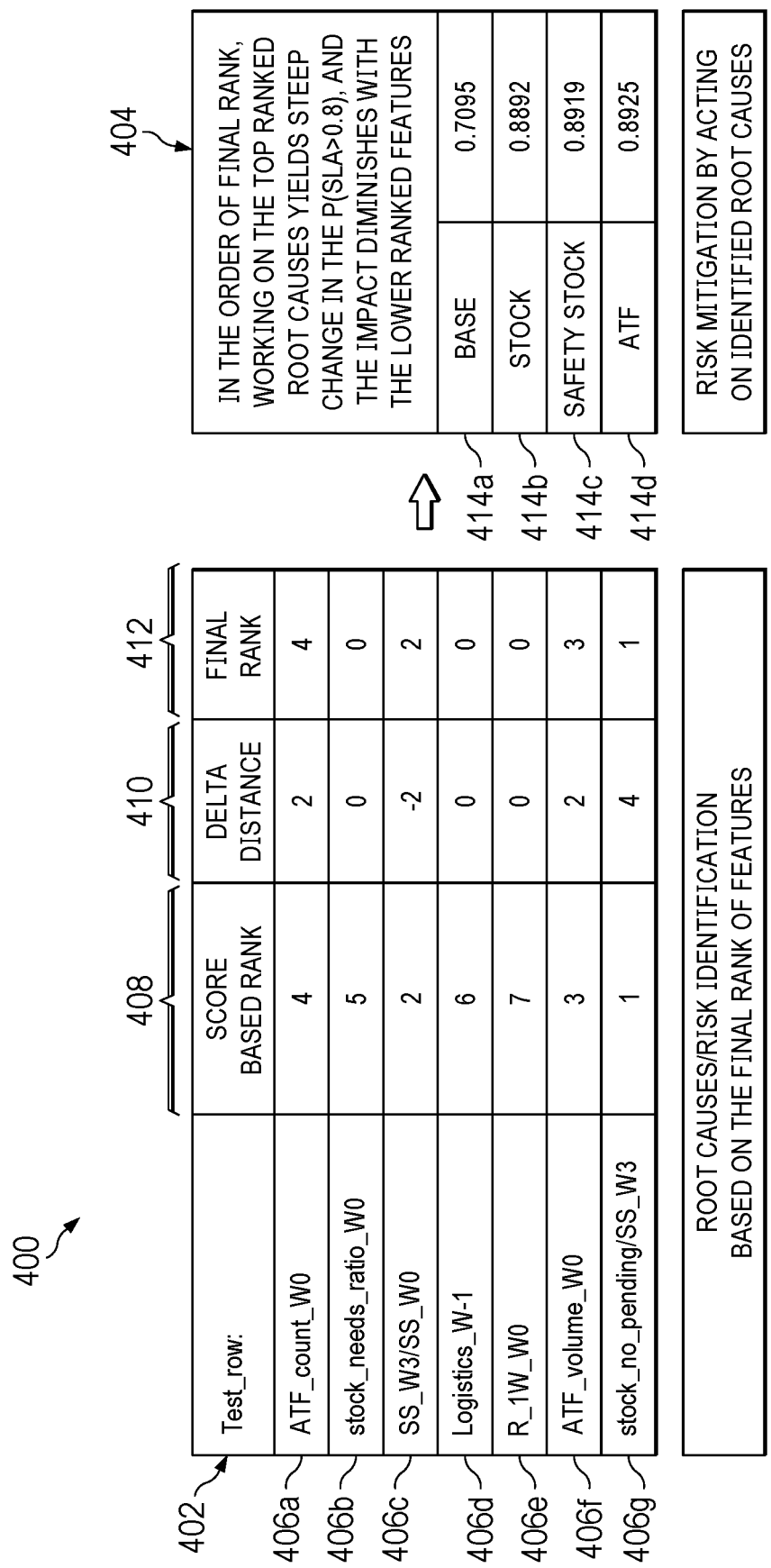
FIG. 4 illustrates a risk mitigation graphical user interface display, according to an embodiment.

Continuing the example, at activity 318 of mutual information resolution method 300, user interface module 218 visualizes the Supply Chain Y/Retailer X feature rankings and resolution actions by generating, in this example, risk mitigation GUI display 400, illustrated by FIG. 4. User interface module 218 displays risk mitigation GUI display 400 on one or more computer 170 output devices 174. PGM resolution system 110 then terminates mutual information resolution method 300.

FIG. 4 illustrates risk mitigation GUI display 400, according to an embodiment. In an embodiment, risk mitigation GUI display 400 may comprise Root Causes chart 402 and Risk Mitigation chart 404. In other embodiments, risk mitigation GUI displays 400 may comprise any charts, features, or other visual displays of any data, according to particular needs.

In the embodiment illustrated by FIG. 4, Root Causes chart 402 on the left-hand side of risk mitigation GUI display 400 displays a list of Supply Chain Y/Retailer X features 406a-406g (beginning with "ATF_count_W0", and then continuing with "stock_needs_ratio_W0", and so on), which PGM resolution system 110 has identified as being most relevant to the predicted low sales figure at Retailer X (predicting Retailer X will sell only 70% of the targeted number of products within Supply Chain Y). Root Causes chart 402 lists Score Based Rank 408, Delta Distance 410, and Final Rank 412 for each identified Supply Chain Y/Retailer X feature.

In the embodiment illustrated by FIG. 4, Risk Mitigation chart 404 on the right-hand side of risk mitigation GUI display 400 displays the estimated effect of modifying the values of one or more Supply Chain Y/Retailer X features 406a-406g in order to address the Retailer X sales shortfall. Risk Mitigation chart 404 may display Supply Chain Y/Retailer X features 406a-406g that PGM resolution system 110 has determined to be the most relevant features to the Retailer X sales shortfall problem, and the features in which the fewest changes may make the largest impact on the Retailer X sales KPI. In an embodiment, by altering both the "Base" 414a and "Stock" 414b features and associated feature variables, the percentage of product sales that Retailer X will be able to execute is estimated to increase to 0.8892 (indicating 88.92% of the targeted number of products, or an 18.92% increase over the initial 70% prediction). By further modifying the variables of the "Safety Stock" 414c and "ATF" 414d features, the percentage of product sales that Retailer X will be able to execute further increases to 89.25%.

Figure 5A:
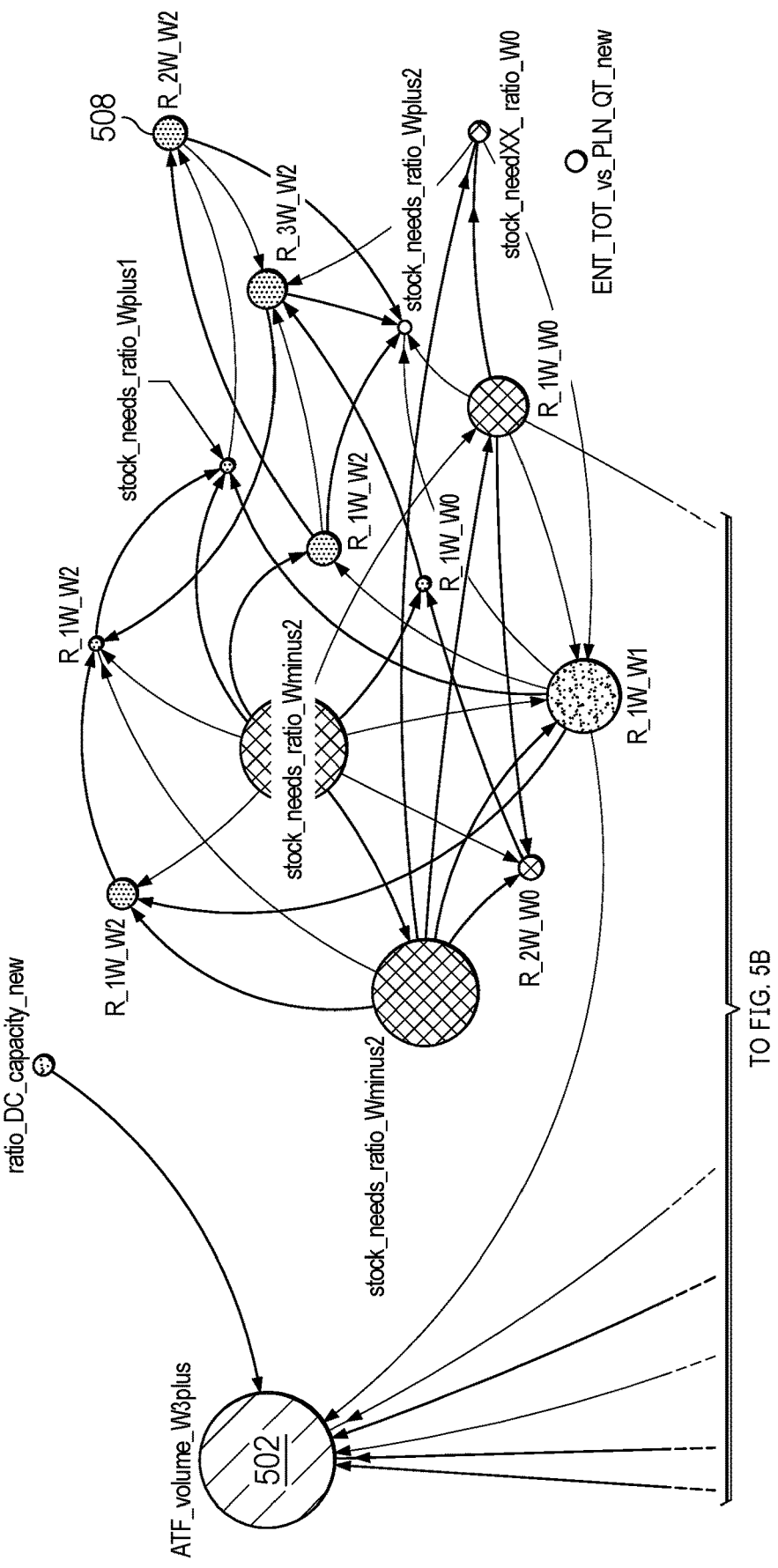
FIGS. 5A-5B illustrate a Bayesian network graphical user interface display, according to an embodiment.
Figure 5B:
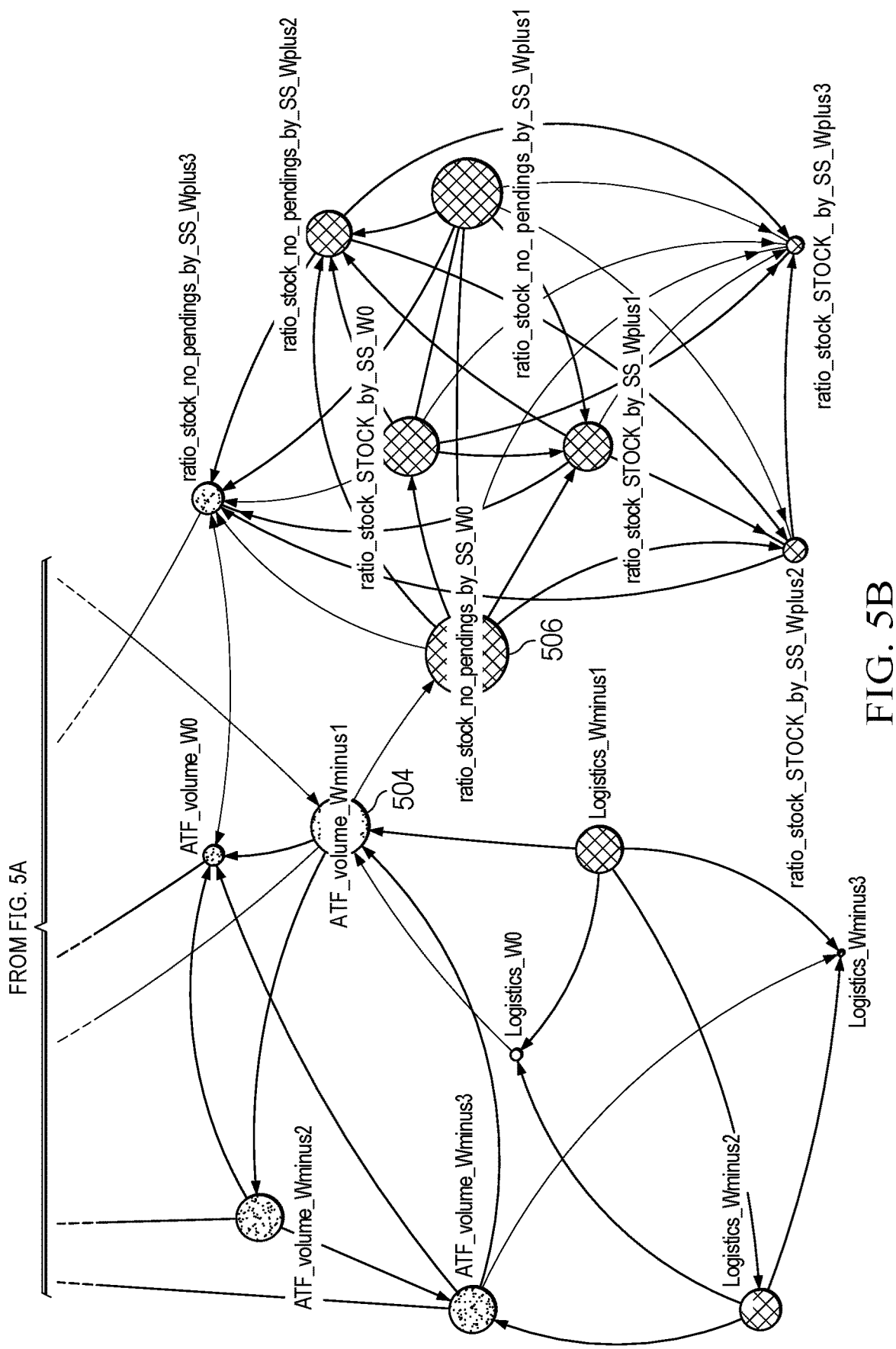

FIGS. 5A-5B illustrate Bayesian network GUI display 500, according to an embodiment. In an embodiment, user interface module 218 may access data stored in PGM resolution system 110 database 114, including but not limited to one or more Bayesian networks stored in probabilistic graphical models 228, and may use the data stored in PGM resolution system 110 database 114 to generate Bayesian network GUI display 500. Although FIGS. 5A-5B illustrate user interface module 218 generating Bayesian network GUI display 500 in a particular configuration, embodiments contemplate user interface module 218 generating Bayesian network GUI displays 500 of any configuration and displaying any data stored in PGM resolution system 110 database 114, according to particular needs.

In an embodiment, Bayesian network GUI display 500 may visualize or display various information about the Bayesian network stored in PGM resolution system 110 probabilistic graphical models 228. Bayesian network GUI display 500 may display one or more KPIs or targeted variables, such as, for example, "ATF_volume_W3plus" root node 502 at the top left of Bayesian network GUI display 500, in separate colors (such as, for example, green) to emphasize one or more target nodes or target variables associated with particular nodes. Bayesian network GUI display 500 may arrange and display nodes according to node strength and edges according to edge strength. In an embodiment, Bayesian network GUI display 500 may display nodes according to L1 and L2 features data 244 stored in PGM resolution system 110 database 114. For example, in an embodiment, Bayesian network GUI display 500 may display node strength as a function of node size, wherein stronger nodes are displayed as larger than weaker nodes, and node color may be based on the level of the nodes (for example, in an embodiment, the one or more root nodes 502 may be illustrated in green, the L1 nodes 504 may be illustrated in orange, and the L2 nodes 506 may be illustrated in gray. In the example of FIGS. 5A-5B, level 3 (or L3) nodes 508 may be illustrated in yellow. That is, L1 nodes 504 have an indirect relationship with root node 502, L2 nodes 506 have an indirect relationship (through L1 nodes 504) with root node 502, and L3 nodes 508 have an indirect relationship (through L2 nodes 506 and L1 nodes 504) with root node 502. Node size may, in an embodiment, indicate good candidate nodes on which to implement supply chain feature changes to bring about one or more desirable KPI or SLA changes, with larger nodes being more likely to affect one or more KPIs and/or SLAs as compared to smaller nodes.

Figures 6, 6A:
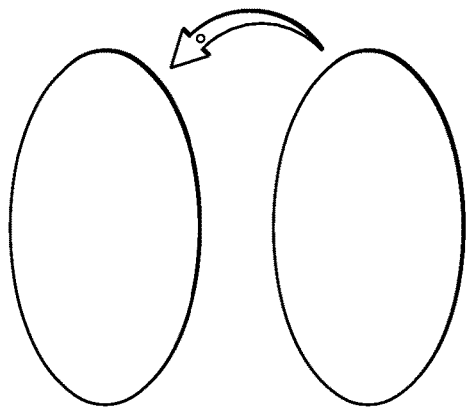
FIGS. 6A-6B illustrate a resolution recommendation graphical user interface display, according to an embodiment.
Figure 6B:
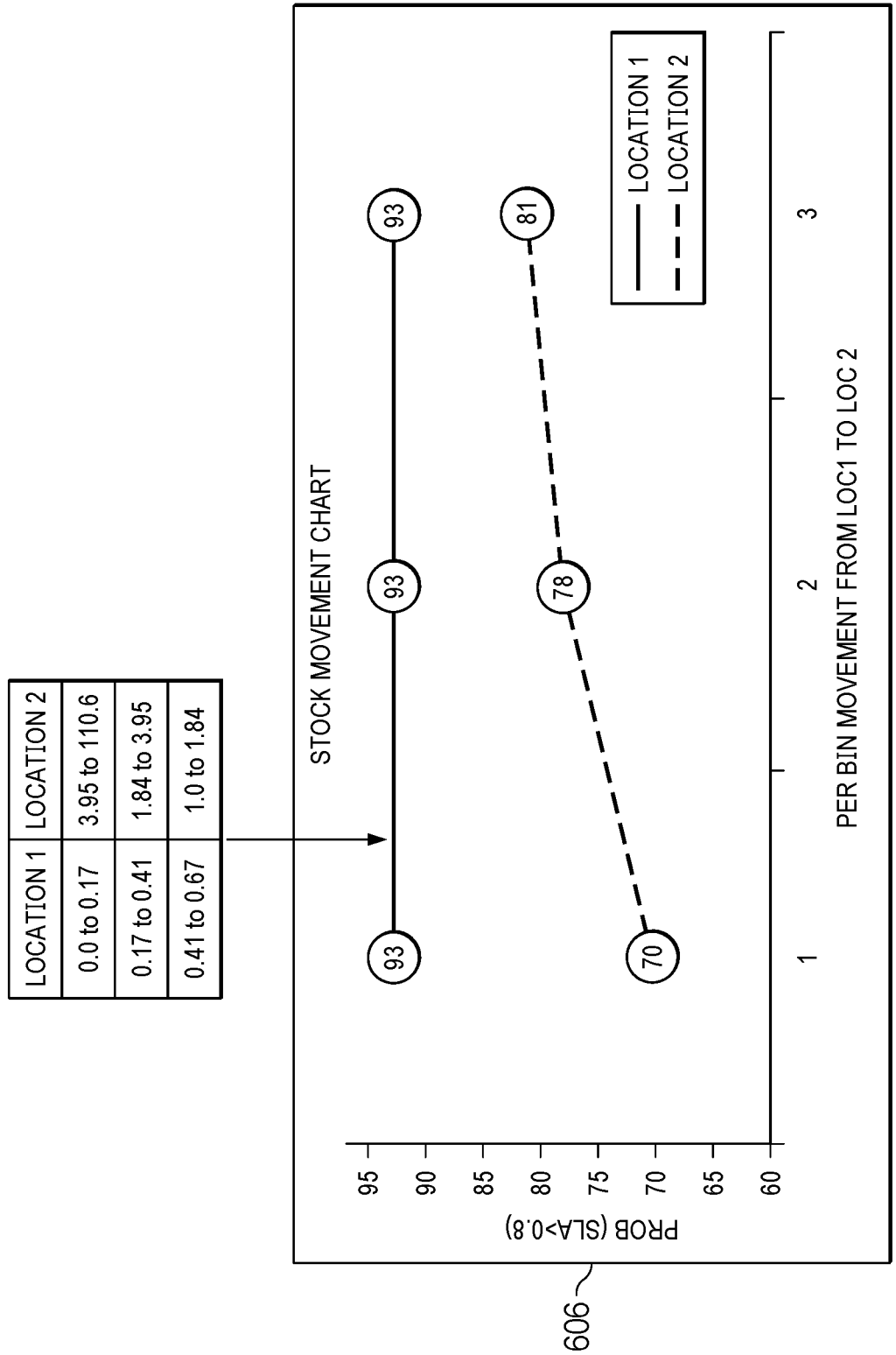

FIGS. 6A-6B illustrate resolution recommendation GUI display 600, according to an embodiment. In an embodiment, user interface module 218 may access data stored in PGM resolution system 110 database 114, including but not limited to one or more Bayesian networks stored in probabilistic graphical models 228 and one or more resolution actions stored in resolutions data 248, and may use the data stored in PGM resolution system 110 database 114 to generate resolution recommendation GUI display 600. Although FIGS. 6A-6B illustrate user interface module 218 generating resolution recommendation GUI display 600 in a particular configuration, embodiments contemplate user interface module 218 generating resolution recommendation GUI displays 600 of any configuration and displaying any data stored in PGM resolution system 110 database 114, according to particular needs.

According to embodiment, resolution recommendation GUI display 600 may display two or more locations in the supply chain (in the example illustrated by FIGS. 6A-6B, location 1 602A and location 2 602B). One assumption of the example of FIGS. 6A-6B is that there exists a path between Location 1 602A and Location 2 602B. An analysis represented by resolution recommendation GUI display 600 may show only a possible opportunity, not network connectivity between the locations 602. Resolution recommendation GUI display 600 may also display features and/or attributes 604 associated with each of location 1 602A and location 2 602B, such as "ATF_count_W0", "stock_no_pending/SS_W3", and so on. In an embodiment, PGM resolution system 110 may perform the actions of mutual information resolution method 300, described above, to locate features that have the strongest impact across both of location 1 602A and location 2 602B. Resolution recommendation GUI display 600 may also display one or more potential resolution actions 606 to enable location 1 602A and/or location 2 602B to better fulfill one or more KPIs and/or one or more SLAs, and/or may recommend the modification of one or more features shared between location 1 602A and/or location 2 602B by, for example, recommending the transfer of 2 units of "stock_no_pending/SS_W3" from location 2 602B to location 1 602A to address a shortfall at location 1 602A without unduly depleting reserves at location 2 602B.

In an embodiment, resolution recommendation GUI display 600 may display each location (in the example illustrated by FIGS. 6A-6B, location 1 602A and location 2 602B) using particular colors that correspond to whether or not each location can fulfill its target KPIs and/or SLAs. For example, in an embodiment, resolution recommendation GUI display 600 may display location 2 602B using a green color, indicating that location 2 602B will meet at least 80% of all target KPI and SLA objectives (other examples may use any percentage, including 90%, 95%, or any other number); resolution recommendation GUI display 600 may display location 1 602A using a red color, indicating that location 1 602A is predicted to fail to meet at least 80% of all target KPI and SLA objectives. In this embodiment, user interface module 218 may respond to input to one or more computer 170 input devices 162, and may enable supply chain planners 132d to "borrow" one or more resources, features, attributes, and/or other variables from location 2 602B, and transfer the one or more resources, features, attributes, and/or other variables to location 1 602A, to enable location 1 602A to better meet at least 80% of all location 1 602A KPI and SLA targets without unduly impacting the ability of location 2 602B to meet at least 80% of location 2 602B KPI and SLA targets. Resolution recommendation GUI display 600 may change the display colors of location 1 602A and/or location 2 602B as the proposed reallocations of resources, features, attributes, and/or other values between location 1 602A and location 2 602B affect each of location 1 602A's and location 2 602B's abilities to meet at least 80% of all KPI and SLA targets; other embodiments may change display colors in relation to any percentage of KPI and SLA targets.

Figure 7:
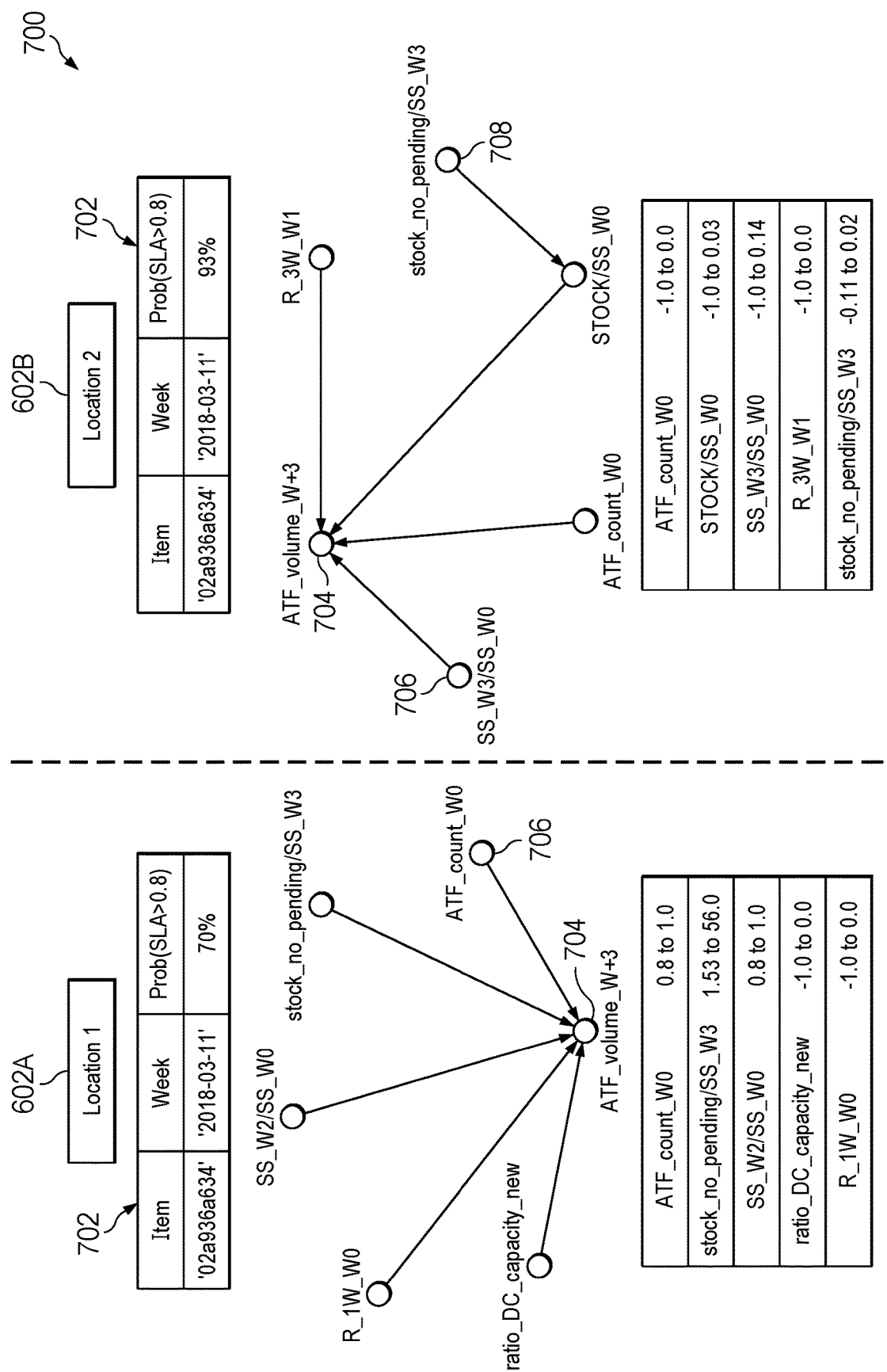
FIG. 7 illustrates a mutual information location graphical user interface display, according to an embodiment.

FIG. 7 illustrates mutual information location GUI display 700, according to an embodiment. In an embodiment, user interface module 218 may access data stored in PGM resolution system 110 database 114, including but not limited to one or more Bayesian networks stored in probabilistic graphical models 228, and may use the data stored in PGM resolution system 110 database 114 to generate mutual information location GUI display 700. Although FIG. 7 illustrates user interface module 218 generating mutual information location GUI display 700 in a particular configuration, embodiments contemplate user interface module 218 generating mutual information location GUI displays 700 of any configuration and displaying any data stored in PGM resolution system 110 database 114, according to particular needs.

In an embodiment, mutual information location GUI display 700 may display location 1 602A and location 2 602B features that share mutual information 702, including but not limited to statistical dependencies and/or shared values that are relevant to one or more KPIs and/or SLAs. Mutual information location GUI display 700 may display location 1 602A and location 2 602B features as L1 nodes 706 connected to one or more root nodes 704, and/or as one or more L2 features as L2 nodes 708 connected to one or more L1 nodes 706. Mutual information location GUI display 700 may emphasize the relationship of one or more L1 features and one or more L2 features on one or more KPIs and/or SLAs by, for example, emphasizing one or more L1 features that more directly affect one or more root nodes than do one or more L2 features, thereby enabling supply chain planners 140 to make alterations at one or more nodes that most directly affect one or more KPIs and/or SLAs.

Figure 8:
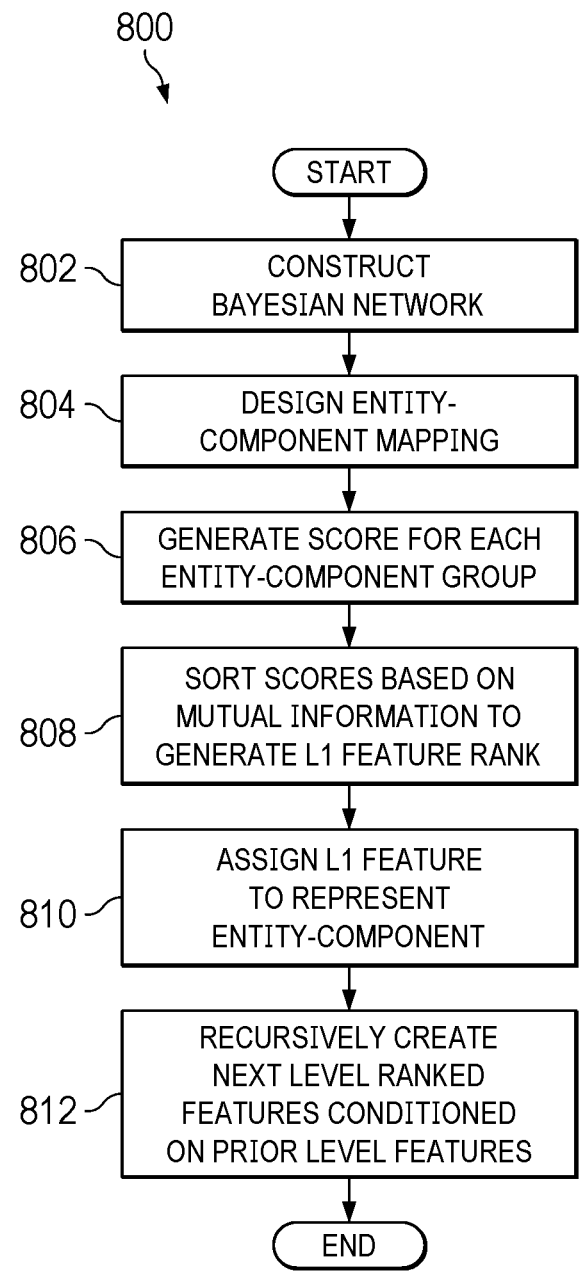
FIG. 8 illustrates a method of generating hierarchical relationships and visualizations, according to an embodiment.

FIG. 8 illustrates hierarchical method 800 of generating hierarchical relationships and visualizations, according to an embodiment. In an embodiment, hierarchical method 800 may analyze the impact of multiple separate features and feature levels on one or more KPI/SLA outputs. Hierarchical method 800 may comprise one or more activities, which although described in a particular order may be implemented in one or more combinations, according to particular needs.

At activity 802 of hierarchical method 800, PGM resolution system 110 constructs a Bayesian network. At activity 804 of hierarchical method 800, PGM resolution system 110 designs an entity-component mapping that groups individual features, components, and/or other nodes and/or variables of the Bayesian network into different business units based on shared features, components, and/or other variables. In an embodiment, PGM resolution system 110 may use following algorithm to design entity-component mappings and/or to execute other activities of hierarchical method 800, according to particular needs.

The algorithm begins by PGM resolution system 110 assigning a target KPI as the root node. Thereafter, PGM resolution system 110 needs to create a hierarchy of features, such as L1 and L2 features, with respect to the target KPI. Based on business experience, PGM resolution system 110 maps all attributes under each category. As an example, this may include a feature dictionary. Then, PGM resolution system 110 iterates over each category to calculate an MI score for each feature under that category. Then PGM resolution system 110 assigns the features with the maximum MI score as the category representative, which is an L1 feature. This revised feature mapping is called a L1 feature set. An example of an L1 feature set may be the following:

{'ATF_count_W0': ['ATF_volume_W-2', 'ATF_count_W-2', 'ATF_count_W-1', 'ATF_volume_W0', 'ATF_volume_W-1'. 'ATF_volume_W-3', 'ATF_count_W-3'], 'stock_needs_ratio_W-1': ['STOCK/SS_W0', 'stock_no_pending/SS_W3', 'stock_no_pending/SS_W0', 'stock_needs_ratio_W-2', 'STOCK/SS_W1', 'stock_needs_ratio_W0', 'STOCK/SS_W2', 'stock_nopending/SS_W1', 'STOCK/SS_W3'], 'SS_W3/SS_W0': ['SS_W2/SS_W0', 'SS_W1/SS_W0'], 'Logisitics_W-1' ['ratio_DC_capacity_new'], 'R-1W_W0': ['R_3W_W0', 'R_2W_W2', 'R_3W_W2', 'R_1W_W2', 'R_2W_W1', 'R_2W_W0', 'R_3W_W1']}

The algorithm then includes PGM resolution system 110 calculating a conditional MI score. The conditional MI score may be calculated by iterating over each feature in the above L1 category, and calculating the conditional MI score according to equation (2) below:

$$MI(X; Y|Z) = \sum_{x,y,z} P(x, y, z)\log_2 \frac{P(x, y|z)}{P(X|Z)P(y|Z)} \quad (2)$$

In equation (2), X is the iterated features, Y is the target KPI and Z is the L1 feature representative. Based on the conditional MI score, PGM resolution system 110 determines the L2 feature for each category. The L2 features for each category may be represented in TABLE 1 below.

| feat den | conditional col | mi conditional |
|---|---|---|
| ATF count W0 | ATF volume W + 3 ATF volume W0 ATF count W0 | 6.001715e−04 |
| R 1W W0 | ATF volume W + 3 R 3W W2 R 1W W0 | 1.196396e−16 |
| SS W3/SS W0 | ATF volume W + 3 SS W2/SS W0 SS W3/SS W0 | 3.454976e−17 |
| ratio DC capacity new | ATF volume w + 3 Logistics W − 1 ratio DC capacity | −4.417347e−17 |
| stock needs ratio W0 | ATF volume W + 3 stock no pending/SS W3/stock | 4.940359e−02 |

For the L2 features shown in TABLE 2, PGM resolution system 110 may use a threshold to arrive at the L2 features. For example, if the threshold (12_threshold) is equal to 0.0001, then the L2 features may be determined according to df_12_grouped.loc [df_12_grouped ['mi_conditional'] >12_threshold]['conditional_col'].values.

Returning to method 800, at activity 806, PGM resolution system 110 generates a score for each entity-component group, based on mutual information. At activity 808 of hierarchical method 800, PGM resolution system 110 may sort the scores for each entity-component based on mutual information to locate the highest-scored feature, to which PGM resolution system 110 assigns a level 1 (L1) feature rank for the particular entity-component. At activity 810 of hierarchical method 800, for each entity-component, PGM resolution system 110 assigns the highest-scoring L1 feature selected during the fourth action to represent the entity component. At activity 812 of hierarchical method 800, PGM resolution system 110 recursively creates next level ranked features (including but not limited to L2 features) within each entity-component conditioned on prior level features (for example, for L2 features, conditioned on prior L1 features). PGM resolution system 110 may then terminate hierarchical method 800.

Figure 9:
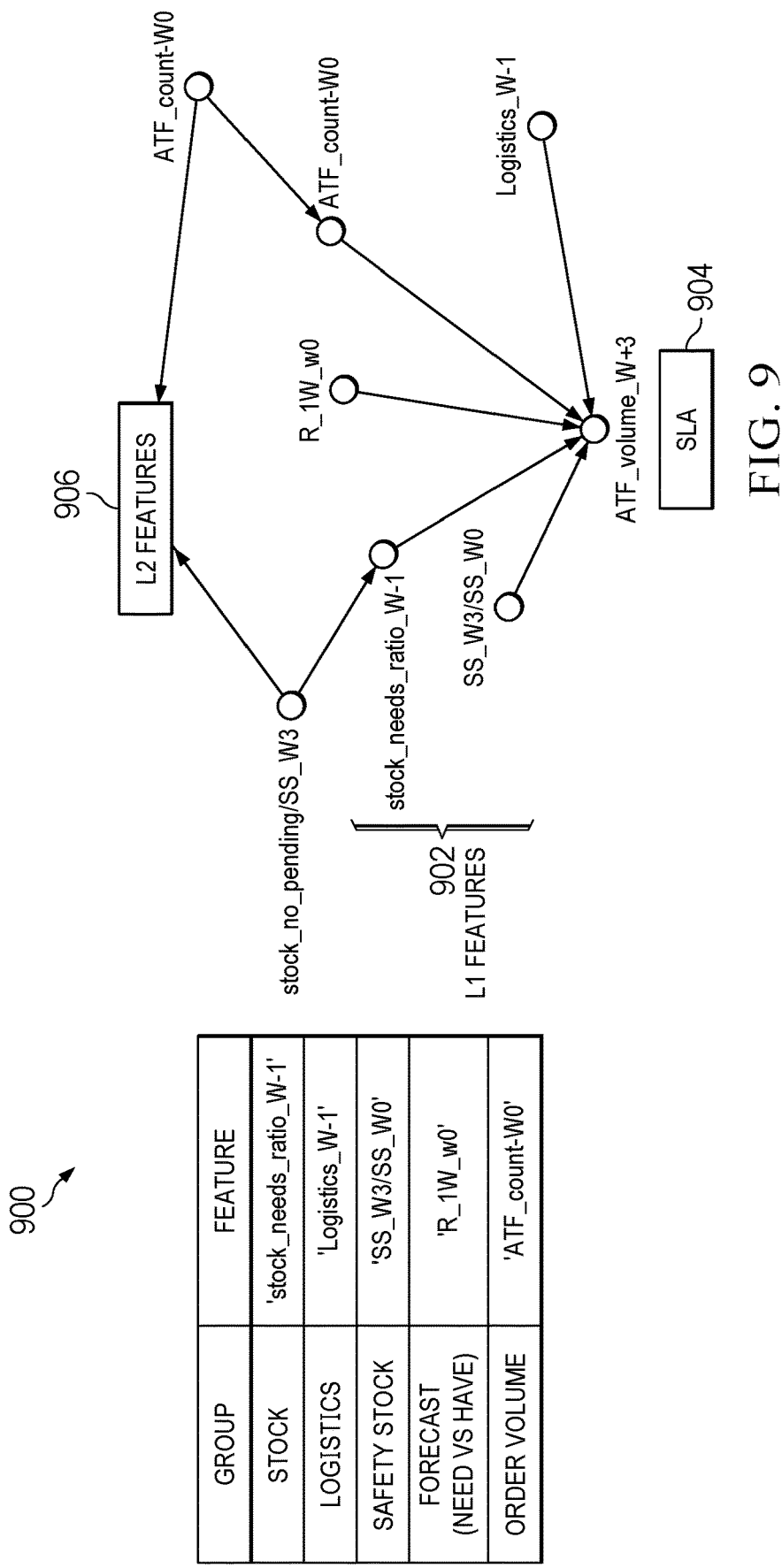
FIG. 9 illustrates a hierarchical graphical user interface display, according to an embodiment.

FIG. 9 illustrates hierarchical GUI display 900, according to an embodiment. PGM resolution system 110 may generate and display one or more hierarchical GUI displays 900 after performing the actions of hierarchical method 800 described above, according to an embodiment. Although FIG. 9 illustrates hierarchical GUI display 900 in a particular configuration, embodiments contemplate PGM resolution system 110 accessing any data stored in PGM resolution system 110 database 114 and displaying hierarchical GUI displays 900 in any configuration and comprising any data, according to particular needs.

In an embodiment, hierarchical GUI display 900 may display one or more root node KPIs/SLAs (as illustrated by FIG. 9, "SLA"), one or more L1 features 902 which PGM resolution system 110 has identified as most directly influencing and/or affecting the performance of root node KPIs/SLAs 904, and one or more L2 features 906 which influence L1 features 902. By making changes to L1 features 902, supply chain planner 140 may most directly influence the output of one or more root node KPIs/SLAs 904.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

What is claimed is:

1. A computer-implemented method, comprising:
    training, by a computer comprising a processor and memory, a probabilistic graphical model based on historical attributes of a supply chain comprising one or more supply chain entities to represent a performance of one or more supply chain entities in the supply chain;
    selecting, by the computer, one or more supply chain entity target variables;
    collating, by the computer and with a use of one or more machine learning models, a list of one or more features and feature classes pertaining to the one or more selected supply chain entity target variables;
    calculating, by the computer, first-level features and second-level features associated with the list of one or more features and feature classes;
    generating, by the computer, one or more supply chain output predictions based on the trained probabilistic graphical model, wherein the one or more supply chain output predictions are based on test data;
    comparing, by the computer, the one or more supply chain output predictions to one or more desired supply chain outputs to determine a delta distance;
    generating, by the computer, one or more resolution actions, based at least in part on the first-level features and second-level features, to decrease the delta distance between the one or more supply chain output predictions and the one or more desired supply chain outputs;
    adjusting, by the computer, the trained probabilistic graphical model based, at least in part, on the one or more supply chain output predictions; and
    sending, by the computer, instructions to automated machinery, wherein based on the instructions, the automated machinery locates items to add to or remove from an inventory or shipment for the one or more supply chain entities.

2. The computer-implemented method of claim 1, further comprising:

generating, by the computer, a Bayesian network graph visualization to display a network graph.

3. The computer-implemented method of claim 1, further comprising:
generating, by the computer, recursive level-ranked features based on the list of one or more features and feature classes; and
displaying, by the computer and on a display device, a network graph comprising the recursive level-ranked features.

4. The computer-implemented method of claim 1, further comprising:
receiving, by the computer, a query to identify a root cause of a particular metric in the supply chain; and
traversing, by the computer, the probabilistic graphical model to identify features having a largest impact on the particular metric.

5. The computer-implemented method of claim 1, wherein the one or more supply chain output predictions are based on ensemble data, the ensemble data comprising a combination of the training data and the test data.

6. The computer-implemented method of claim 3, wherein the ranking for the recursive level-ranked features is based upon a magnitude of change a feature will cause for a KPI or SLA of the supply chain.

7. The computer-implemented method of claim 1, wherein the historical attributes are normalized, aggregated, or rescaled to allow a direct comparison of data received from different supply chain entities.

8. A system, comprising:
a computer, comprising a processor and memory, the computer configured to:
train a probabilistic graphical model based on historical attributes of a supply chain comprising one or more supply chain entities to represent a performance of one or more supply chain entities in the supply chain;
select one or more supply chain entity target variables;
collate with a use of one or more machine learning models, a list of one or more features and feature classes pertaining to the one or more selected supply chain entity target variables;
calculate first-level features and second-level features associated with the list of one or more features and feature classes;
generate one or more supply chain output predictions based on the trained probabilistic graphical model, wherein the one or more supply chain output predictions are based on test data;
compare the one or more supply chain output predictions to one or more desired supply chain outputs to determine a delta distance;
generate one or more resolution actions, based at least in part on the first-level features and second-level features, to decrease the delta distance between the one or more supply chain output predictions and the one or more desired supply chain outputs;
adjust the trained probabilistic graphical model based, at least in part, on the one or more supply chain output predictions; and
send instructions to automated machinery, wherein based on the instructions, the automated machinery locates items to add to or remove from an inventory or shipment for the one or more supply chain entities.

9. The system of claim 8, wherein the computer is further configured to:
generate a Bayesian network graph visualization to display a network graph.

10. The system of claim 8, wherein the computer is further configured to:
generate recursive level-ranked features based on the list of one or more features and feature classes; and
display on a display device, a network graph comprising the recursive level-ranked features.

11. The system of claim 8, wherein the computer is further configured to:
receive a query to identify a root cause of a particular metric in the supply chain; and
traverse the probabilistic graphical model to identify features having a largest impact on the particular metric.

12. The system of claim 8, wherein the one or more supply chain output predictions are based on ensemble data, the ensemble data comprising a combination of the training data and the test data.

13. The system of claim 10, wherein the ranking for the recursive level-ranked features is based upon a magnitude of change a feature will cause for a KPI or SLA of the supply chain.

14. The system of claim 8, wherein the historical attributes are normalized, aggregated, or rescaled to allow a direct comparison of data received from different supply chain entities.

15. A non-transitory computer-readable medium embodied with software, the software when executed:
trains a probabilistic graphical model based on historical attributes of a supply chain comprising one or more supply chain entities to represent a performance of one or more supply chain entities in the supply chain;
selects one or more supply chain entity target variables;
collates with a use of one or more machine learning models, a list of one or more features and feature classes pertaining to the one or more selected supply chain entity target variables;
calculates first-level features and second-level features associated with the list of one or more features and feature classes;
generates one or more supply chain output predictions based on the trained probabilistic graphical model, wherein the one or more supply chain output predictions are based on test data;
compares the one or more supply chain output predictions to one or more desired supply chain outputs to determine a delta distance;
generates one or more resolution actions, based at least in part on the first-level features and second-level features, to decrease the delta distance between the one or more supply chain output predictions and the one or more desired supply chain outputs;
adjusts the trained probabilistic graphical model based, at least in part, on the one or more supply chain output predictions; and
sends instructions to automated machinery, wherein based on the instructions, the automated machinery locates items to add to or remove from an inventory or shipment for the one or more supply chain entities.

16. The non-transitory computer-readable medium of claim 15, wherein the software when executed further:
generates a Bayesian network graph visualization to display a network graph.

17. The non-transitory computer-readable medium of claim 15, wherein the software when executed further:
generates recursive level-ranked features based on the list of one or more features and feature classes; and displays on a display device, a network graph comprising the recursive level-ranked features.

18. The non-transitory computer-readable medium of claim 15, wherein the software when executed further:
receives a query to identify a root cause of a particular metric in the supply chain; and
traverses the probabilistic graphical model to identify features having a largest impact on the particular metric.

19. The non-transitory computer-readable medium of claim 15, wherein the one or more supply chain output predictions are based on ensemble data, the ensemble data comprising a combination of the training data and the test data.

20. The non-transitory computer-readable medium of claim 15, wherein the historical attributes are normalized, aggregated, or rescaled to allow a direct comparison of data received from different supply chain entities.

* * * * *